(12) United States Patent
Auer

(10) Patent No.: US 7,327,812 B2
(45) Date of Patent: Feb. 5, 2008

(54) APPARATUS AND METHOD FOR ESTIMATING A PLURALITY OF CHANNELS

(75) Inventor: Gunther Auer, Munich (DE)

(73) Assignee: DoCoMo Communications Laboratories Europe GmbH, Munich (DE)

( * ) Notice: Subject to any disclaimer, the term of this patent is extended or adjusted under 35 U.S.C. 154(b) by 523 days.

(21) Appl. No.: 11/038,674

(22) Filed: Jan. 19, 2005

(65) Prior Publication Data

US 2005/0147025 A1    Jul. 7, 2005

Related U.S. Application Data

(63) Continuation of application No. PCT/EP03/03211, filed on Mar. 27, 2003.

(51) Int. Cl.
*H04B 7/10* (2006.01)
(52) U.S. Cl. ............... 375/347; 375/147; 370/342; 370/203
(58) Field of Classification Search ........... 375/130, 375/147, 267, 347; 370/203, 342; 455/101
See application file for complete search history.

(56) References Cited

U.S. PATENT DOCUMENTS 7,139,320 B1 * 11/2006 Singh et al. .......... 375/260
2005/0047518 A1 * 3/2005 Auer .................... 375/267

OTHER PUBLICATIONS

Weinstein, et al., "Data Transmission by Frequency-Division Multiplexing Using the Discrete Fourier Transform," IEEE Transactions on Communication Technology, vol. Com-19:628-634 (1971).
Fazel, et al., "On the Performance of Convolutionally-Coded CDMA/OFDM for Mobile Communication System," pp. 468-472.

(Continued)

*Primary Examiner*—Temesghen Ghebretinsae
(74) *Attorney, Agent, or Firm*—John J. Penny, Jr.; Steven M. Cohen; Edwards Angell Palmer & Dodge LLP

(57) ABSTRACT

An apparatus for estimating a plurality of channels from a plurality of distinct transmitting points, wherein an input signal includes a super position of signals based on a first pilot sequence transmittable from a first transmitting point and on a second pilot sequence transmittable from a second transmitting point, the first pilot sequence and the second pilot sequence having a phase shift to each other, comprises a transformer, which is operative to translate phase shifts between the first and the second pilot sequence into a delay, so that a first group of a set of discrete values of the transformed signal includes channel information of a first channel and that a second group of a set of discrete values includes channel information of a second channel, a selector for selecting the first group from the set of discrete values and for selecting the second group from the set of discrete values to obtain selected groups, and means for determining channel information for the plurality of channels based on the selected groups. The selection of groups at the output of the transformer for obtaining channel information for the channel allows the construction of a simplified receiver.

25 Claims, 8 Drawing Sheets

OTHER PUBLICATIONS

Jeon, et al., "Two-Dimensional MMSE Channel Estimation for OFDM Systems with Transmitter Diversity," IEEE pp. 1682-1685 (2001).

Li, et al., "Simplified Channel Estimation for OFDM Systems with Multiple Transmit Antennas," IEEE Transactions on Wireless Communications, 1:67-75 (2002).

Barhumi, et al., "Optimal Training Sequences for Channel Estimation in MIMO OFDM Systems in Mobile Wireless Channels," IEEE; pp. 44-1-44-6 (2002).

Chheda, "On the Forward Link Capacity of a Wide Band DS-CDMA System with Transmit Diversity," IEEE, pp. 417-421 (2000).

International Search Report dated Mar. 27, 2003.

International Preliminary Examination Report dated Mar. 27, 2003.

Written Opinion dated Mar. 27, 2003.

Atarashi, et al., "*Variable Spreading Factor Orthogonal Frequency and Code Division Multiplexing (VSF-OFCDM),*" 3RD International Workshop on Multi-Carrier Spread-Spectrum and Related Topics (MC_SS 2001), pp. 113-122 (Sep. 2001).

Yi Gong et al., "Low Rank Channel Estimation for Space-Time Coded Wideband OFDM Systems," Proc. IEEE Vehicular Technology Conference (VTC 2001-Fall), Atlantic City, USA, pp. 772-776.

\* cited by examiner

APPARATUS AND METHOD FOR ESTIMATING A PLURALITY OF CHANNELS

CROSS-REFERENCE TO RELATED APPLICATIONS

This application is a continuation of co-pending International Application No. PCT/EP03/003211, filed Mar. 27, 2003, which designated the United States and was not published in English.

BACKGROUND OF THE INVENTION

1. Field of the Invention

The present invention is in the field of telecommunications and, in particular, in the field of channel estimation in a multiple input scenario, in which a receiver receives signals from more than one transmitting antennas.

2. Description of the Related Art

The steadily-increasing demand for high data rates necessary for today's and future mobile radio applications require high data rate techniques efficiently exploiting the available band width or, in other words, the achievable channel capacity. Therefore, multiple input multiple output (MIMO) transmission systems have achieved considerable importance in recent years. MIMO systems employ a plurality of transmitting points, each of the transmitting points having a transmit antenna, and a plurality of receiving points, each of the receiving points having a receiving antenna, to receive signals being transmitted by the multiple transmitting points through different communication channels. In MIMO techniques, where the signals impinging from several transmitter antennas need to be separated, space-time codes or special multiplexing methods are used.

The signals impinging on each receive antenna are the super-position of the signals from $N_T$ antennas, where $N_T$ denotes a number of transmitting points. This implies new challenges for channel estimation. Channel parameters, like a channel impulse response or a channel transfer function are required for subsequent processing of the received data. While the separation of the signals corresponding to several transmitting points, each of them having a transmit antenna, is a challenging task, the extension from a receiver having one antenna to a system with several receive antennas is straight forward, as long as the signals are mutually uncorrelated. The structure of the channel estimation units is independent of the number of receive antennas $N_R$. The extension from a multiple input single output (MISO) system to a MIMO system is to employ $N_R$ parallel channel estimation units, one for each receiving point (receive antenna).

The use of coherent transmission techniques in wireless systems requires estimation and tracking of the mobile radio channel. Since the signals transmitted from multiple transmit antennas are observed as mutual interference, channel estimation for MIMO systems is different from the single transmit antenna scenario. MIMO systems can be used with a multi-carrier modulation scheme to further improve the communication capacity and quality of mobile radio systems. A prominent representative of multi-carrier modulation techniques is the orthogonal frequency division multiplexing (OFDM) technique. A block diagram of an OFDM system is shown in FIG. 7.

Multi carrier modulation in particular orthogonal frequency division multiplexing (OFDM) has been successfully applied to a wide variety of digital communication systems over the past several years. In particular for the transmission of large data rates in a broadcasting scenario (e.g. digital TV), OFDM's superior performance in transmission over dispersive channels is a major advantage. OFDM has been chosen for various digital broadcasting standards, e.g. DAB or DVB-T. Another wireless application of OFDM is in high speed wireless local area networks (WLAN). OFDM was first introduced in the 1960s. An efficient demodulation utilising the discrete Fourier transform (DFT) was suggested by S. Weinstein and P. Ebert, "Data Transmission by Frequency Division Multiplexing Using the Discrete Fourier Transform", IEEE Transactions on Communication Technology, vol. COM-19, pp. 628-634, October 1971. By inserting a cyclic prefix into the guard interval (GI) longer than the maximum delay of the channel, inter-symbol interference (ISI) can be eliminated completely and the orthogonality of the received signal is preserved. Since future mobile communication systems should support data rates several times higher than current systems, multi-carrier systems with proper coding and interleaving offer both efficient implementation through the application of the Fast Fourier Transform (FFT) and sufficient robustness to radio channel impairments.

Another OFDM-based approach, termed multi-carrier code division multiplex access (MC-CDMA), were spreading in frequency direction as has been introduced in addition to the OFDM modulation, as described in K. Fazel and L. Papke, "On the Performance of Convolutionally-Coded CDMA/OFDM for Mobile Communication Systems", in Proc. IEEE Int. Symposium on Personal, Indoor and Mobile Radio Communications (PIMRC'93), Yokohama, Japan, pp. 468-472, September 1993. MC-CDMA has been deemed to be a promising candidate for the downlink of fourth generation systems. Moreover, a MC/CDMA system with a variable spreading factor has been proposed as described in H. Atarashi and M. Sawahashi, "Variable Spreading Factor Orthogonal Frequency and Code Division Multiplexing (VSF-OFCDM)", in $3^{rd}$ International Workshop on Multi-Carrier Spread-Spectrum & Related Topics (MC-SS 2001), Oberpfaffenhofen, Germany, September 2001.

For OFDM-based MIMO systems, one OFDM modulator is employed on each transmitting point, while OFDM demodulation is performed independently for each receiving point. For OFDM, the signal stream is divided into $N_C$ parallel sub-streams. The $i^{th}$ sub-stream commonly termed $i^{th}$ sub-carrier of the $l^{th}$ symbol block (OFDM symbol) is denoted by $X_{l,i}$. After serial to parallel conversion (S/P) performed by a S/P converter 701 an inverse discrete Fourier transform (DFT) with $N_{FFT}$ points is performed by an IFFT transformer 703 on each block and, subsequently, the guard interval (GI) having $N_{GI}$ samples is inserted by a GI block 705 to obtain a signal $x_{l,n}$ after parallel to serial (P/S) conversion performed by a P/S converter 703. After digital to analogue (D/A) conversion, the signal x(t) is transmitted over a mobile radio channel with an impulse response h(t, τ). The received signal at receive antenna v consists of superimposed signals from $N_T$ transmitting points. Assuming perfect synchronisation, the received signal impinging at receive antenna v at sampling instants $t=[n+lN_{sym}]T_{spl}$ is obtained $$y_{l,n}^{(v)} \triangleq y^{(v)}([n+lN_{sym}]T_{spl}) =$$

-continued $$\sum_{\mu=1}^{N_T} \int_{-\infty}^{\infty} h^{(\mu,\nu)}(t,\tau) \cdot x^{(\mu)}(t-\tau) d\tau + n(t)|_{t=[n+lN_{sym}]T_{spl}}$$

where n(t) represents additive white Gaussian noise, and Nsym=$N_{FFT}$+$N_{GI}$ accounts for the number of samples per OFDM symbol. The * operator denotes convolution. The signal $y_{l,n}$ received by the receiver is first serial to parallel (S/P) converted by a S/P converter 709 and the guard interval is removed by a GI block 711. The information is recovered by performing a discrete Fourier transform (DFT) on the received block of signal samples (in FIG. 7 a FFT transformer 713 is used) to obtain the output of the OFDM demodulation $Y_{l,I}$ in the frequency domain. The received signal at receive antenna ν after OFDM demodulation is given by $$Y_{l,i}^{(\nu)} = \sum_{\mu=1}^{N_T} X_{l,i}^{(\mu)} \cdot H_{l,i}^{(\mu,\nu)} + N_{l,i}$$

where $X_{l,i}^{(\mu)}$ and $H_{l,i}^{(\mu,\nu)}$ denotes the transmitted information symbol and the channel transfer function (CTF) of transmit antenna μ, at sub-carrier i of the $l^{th}$ OFDM symbol, respectively. The term $N_{l,i}$ accounts for additive white Gaussian noise (AWGN) with zero mean and variance $N_o$.

When transmitting an OFDM signal over a multi-path fading channel, the received signal will have unknown amplitude and phase variations. For coherent transmission, these amplitude and phase variations need to be estimated by a channel estimator.

In the following, reference is made to pilot symbol-aided channel estimation (PACE), where a sub-set of the transmitted data is reserved for transmitting known information, termed "pilot symbols". These pilots are used as side information for channel estimation.

To formally describe the problem, the received pilot of OFDM symbol $lD_t$ at the $(iD_f)^{th}$ sub-carrier $$Y_{lD_t,iD_f} = \sum_{\mu=1}^{N_T} X_{lD_t,iD_f}^{(\mu)} H_{lD_t,iD_f}^{(\mu)} + N_{lD_t,iD_f} \quad \tilde{l} = \{1, 2, \cdots, L/D_t\}$$

$$\tilde{i} = \{1, 2, \cdots, N_c/D_f\}$$

where $X_{lD_t,iD_f}^{(\mu)}$ and $H_{lD_t,iD_f}^{(\mu,\nu)}$ denotes the transmitted pilot symbol and the channel transfer function (CTF) of transmit antenna μ, at sub-carrier i=$\tilde{i}D_f$ of the l=$\tilde{l}D_t^{th}$ OFDM symbol, respectively. It is assumed that the CTF varies in the l and in the i variable, i.e. in time and in frequency. The term $N_{lD_t,iD_f}$ accounts for additive white Gaussion noise. Furthermore, l represents the number of OFDM symbols per frame, $N_c$ is the number of sub-carriers per OFDM symbol, $D_f$ and $D_t$ denote the pilot spacing in frequency and time, and $N_T$ is the number of transmit antennas. The goal is to estimate $H^{l,i(\mu)}$ for all {l,i,μ} within the frame $Y_{l,i}$ is measured. Additionally, the symbols $X_{l,i}^{(\mu)}$ at the location (l,i)=($lD_t,\tilde{i}D_f$) are known at the receiver. The channel estimation now includes several tasks:

1. The separation of $N_T$ superimposed signals,
2. Interpolation in case that $D_t$ or $D_f$ are larger than one, and
3. Averaging over the noise $N_{lD_t,iD_f}$ by means of exploiting the correlation of $H_{lD_t,iD_f}^{(\mu,\nu)}$.

In order to estimate $H_{l,i}^{(\mu)}$ given $Y_{lD_t,iD_f}$, there are $N_c$ equations with $N_c N_T$ unknowns, when one OFDM symbol is considered. Thus, a straight-forward solution of this linear equation system does, in general, not exist. By transforming $Y_{lD_t,iD_f}$ to the time domain, the number of unknowns can be reduced, making it possible to solve the resulting equation system in the time domain. This approach has the advantage that DFT-based interpolation, which is a standard technique, can be combined with estimation and separation of $N_T$ superimposed signals in one step, resulting in a computationally efficient estimator.

For time domain channel estimation for MIMO-OFDM systems, the received pilots of one OFDM symbol $Y_{lD_t,iD_f}$ are pre-multiplied by the complex conjugate of the transmitted pilot sequence $X_{lD_t,iD_f}^*$, for $1 \leq \tilde{i} \leq N'_P$. Then the result is transformed into the time domain via an $N'_P$-point IDFT. Subsequently, the $N_T$ superimposed signals are separated by a matrix inversion. The time domain channel estimate is obtained by filtering the output of the IDFT operation with a finite impulse response (FIR) filter. The DFT-based interpolation is performed simply by adding $N_c$-Q zeros for the channel impulse response (CIR) estimates, i.e. to extend the length of the estimate of length Q to $N_c$ samples. This technique is called of zero padding. An $N'_P$-point DFT transforms the CIR estimate of the pilots to the frequency response estimate of the entire OFDM symbol.

Estimators based on discrete Fourier transform (DFT) have the advantage that a computationally efficient transform in the form of the Fourier transform does exist and that DFT based interpolation is simple.

The performance of the estimation in general is dependent on the choice of the pilot symbols. It is desirable to chose a set of pilot sequences, which minimises the minimum mean squared error (MMSE) criterium (which is a measure of the performance) and the computational complexity of the estimator. Estimators based on the least squares (LS) and the MMSE criterium for OFDM-MIMO systems have been systematically derived by Y. Gong and K. Letaief in: "Low Rank Channel Estimation for Space-Time Coded Wideband OFDM Systems," in Proc. IEEE Vehicular Technology Conference (VTC'2001-Fall), Atlantic City, USA, pp. 722-776, 2001.

I. Barhumi et al describe in: "Optimal training sequences for channel estimation in MIMO OFDM systems immobile wireless channels", International Zurich Seminar on Broadband Communications (IZS02), February, 2002 a channel estimation and tracking scheme for MIMO OFDM systems based on pilot tones. In particular, the authors describe a channel estimation scheme based on pilot tones being orthogonal and phase-shifted to each other. Although the pilot symbols described in the above-cited prior art allow an accurate channel estimation, an enormous computational complexity at the receiver is required in order to perform matrix inversions required by the channel estimation algorithm. Due to this high computational complexity, the estimation scheme described in the above prior art document cannot be implemented at low cost, so that the disclosed algorithm may not be suitable for mass-market mobile receivers.

Y. Li, et ("Simplified Channel Estimation for OFDM Systems with Multiple Transmit Antennas," IEEE Transactions on Wireless Communications, vol. 1, pp. 67-75, January 2002), proposed a channel estimation scheme for OFDM with multiple transmit antennas which is based on the DFT transform. In particular, Li discloses a method for generating pilot symbols to be transmitted by multiple transmit and receive antennas and to be exploited at the receiver for channel estimation. These pilot symbols are generated by multiplying a training sequence having good timing and frequency synchronisation properties by a complex sequence introducing an additional phase shift between the pilot symbols and between the subsequent values of each pilot symbol, as well. To be more specific, each value of a training sequence is multiplied by a complex factor, which introduces a phase shift, wherein the phase shift is dependent of a number being assigned to the value being multiplied, on a number assigned to the corresponding transmitting point and a total number of transmitting points. The pilot symbols are orthogonal and phase shifted to each other. The pilot symbols are modulated by an OFDM scheme and transmitted through a plurality of communication channels. At a receiver, which is one of a plurality of receivers, a signal being received includes a super-position of the plurality of transmitted signals through the plurality of communication channels. Li et al presented further a design rule for the pilot tones based on phase-shifted sequences which is optimum in the mean squared error (MSE) sense. Moreover, a matrix inversion, which is, in general, required for the estimator, can be avoided by choosing orthogonal pilot sequences. However, due to a difficulty of obtaining perfect orthogonality between training sequences, matrix inversions may be necessary.

FIG. 8 shows prior art channel estimation scheme as taught by Li, where the case of two transmitting antennas is considered.

The prior art channel estimator includes a plurality of multipliers, wherein FIG. 8 shows only three multipliers being associated with the $k^{th}$ value of a $n^{th}$ received sequence r[n,k]. A first multiplier 901, a second multiplier 903 and a third multiplier 905 arranged in parallel include first and second inputs and outputs, respectively. The output of the first multiplier 901 is connected to a first inverse fast Fourier transform (IFFT) block 907, the output of the second multiplier 903 is connected to a second IFFT block 909 and the output of the third multiplier 905 is connected to the third IFFT block 911. It should be mentioned here that in total, K multipliers are connected to each IFFT block, wherein K denotes a length of a received sequence in the frequency domain, and a total number of 3K input signals are provided to the three IFFT blocks. Each of the IFFT blocks 907, 909 and 911 is operative to perform an inverse fast Fourier algorithm applied to K input values, respectively. Furthermore, each of the IFFT blocks 907, 909 and 911 includes a number of outputs, wherein only the first $K_0$ outputs of each IFFT block are used. The respective remaining outputs are, for example, connected to ground.

$K_0$ outputs of the first IFFT block 907 are connected to a first estimation block 913 and the first $K_0$ outputs of the third IFFT block 911 are connected to a second estimation block 915. The $K_0$ outputs of the second IFFT block 909 are connected to the first estimation block 913 and to the second estimation block 915, respectively. The first estimation block 913 and the second estimation block 915 have $K_0$ outputs, each of the outputs being connected to a corresponding filter 917 of a plurality of filters, each of the filters having an output, respectively. The $K_0$ outputs of the filters 917 corresponding to the first estimation block 913 are connected to a first Fourier transform (FFT) block 917 and the $K_0$ outputs of the filter 917 corresponding to the second estimation block 915 are connected to a second FFT block 921. The first FFT block 919 and the second FFT block 921 have K outputs, where K is, as stated above, the number of sub-carriers. Furthermore, due to the simplified algorithm described by Li, the outputs of the first filters 917 corresponding to the first estimation block 913 are connected to the second estimation block 915 and the outputs of the filter 917 corresponding to the second estimation block 915 are further connected to the first estimation block 913, so that a plurality of feedback loops is established.

As stated above, FIG. 8 shows an example of the prior art estimator for the case of two transmit antennas, so that the received signal r[n,k] is a superposition of two transmitted signals being possibly corrupted by channel noise. The received signal is split into two received signals by a splitting means not shown in FIG. 8. The copies of the received signals are then multiplied by complex conjugated signals corresponding to the respective transmit antennas. Moreover, the pilot symbol transmitted by the first transmit antenna is multiplied by a complex conjugated version of the pilot symbol transmitted by the second antenna. More precisely, the K values of the first copy of the received signal are multiplied by K values of the complex conjugated version of the pilot symbol transmitted by the first antenna. The K values of the second version of the received signal is multiplied by K values of the complex conjugated version of the pilot symbol transmitted by the second transmit antenna. Furthermore, the K values of the pilot symbol transmitted by the first antenna is multiplied by K complex conjugated values of the pilot symbol transmitted by the second transmit antenna in order to obtain intermediate values required by the subsequent channel estimation algorithm.

As stated above, all multiplications are performed in parallel, so that the K results from the multipliers 901 are fed to the first IFFT block 907. K results from the K multipliers 903 are fed to the second IFFT block 909. K results from the K multipliers 905 are fed to the third IFFT block 911. Each respective IFFT block is operative to perform an inverse fast Fourier transform in order to transform the frequency domain input signals into time domain output signals.

The first and the second estimation block, 913 and 915, are operative to perform a channel estimation algorithm based on the plurality of the input signals. More precisely, the first estimation block 913 receives $3K_0$ input signals to generate $K_0$ output signals corresponding to the channel impulse response of the first channel from the first transmit antenna to the considered receive antenna. The second estimation block 915 receives, in an analogue way, $3K_0$ input signals to generate $K_0$ output values corresponding to the second communication channel from the second transmit antenna to the receive antenna. The respective $K_0$ output values are then filtered by filters 917.

As stated above, the respective output signals from the filters are fed back to the first and second channel estimation blocks 913 and 915, since the channel estimation blocks 913 and 915 are operative to estimate the channel impulse response of the respective communication channels based on previously-calculated values and on current values obtained from the IFFT blocks. Each estimation block applies an estimation algorithm where matrix by vector multiplications instead of matrix inversions are performed in order to calculate desired channel impulse responses. After filtering and zero padding to a length required by the following fast Fourier transform, a channel transfer function of the first and of the second communication channels are obtained.

As stated above, Li avoids matrix inversions by introducing an iterative scheme where matrix by vector multiplications appear and by exploiting the orthogonality of the pilot symbols. However, in order to calculate two channel impulse responses corresponding to the two communication channels, three inverse fast Fourier transforms, a splitting means and 3K multipliers are required. Moreover, the channel estimation algorithm applied by Li has still a high complexity due to the required matrix by vector multiplications. Hence, with an increasing number of transmit antennas, the complexity of the complicated estimation scheme proposed by Li rapidly increases due to the high number of complex valued multiplications. In addition, the multiplication of the two pilot symbols followed by an inverse Fourier transform is necessary in order to provide a plurality of intermediate values required for channel estimation. Hence, the estimation blocks 913 and 915 cannot operate independently, so that additional timing and control operations are necessary.

SUMMARY OF THE INVENTION

It is an object of the present invention to provide an improved concept for channel estimation with reduced complexity.

In accordance with a first aspect, the present invention provides an apparatus for estimating a plurality of channels from a plurality of distinct transmitting points to a receiving point, wherein an input signal includes a superposition of a first signal based on a first pilot sequence transmittable from a first transmitting point and a second signal based on a second pilot sequence transmittable from a second transmitting point, the first pilot sequence and the second pilot sequence being orthogonal to each other within a predetermined orthogonality range and having a phase shift to each other, having a transformer for transforming the input signal into a transformed signal having a set of discrete values, the transformer being operative to translate the phase shift between the first and the second pilot sequence into a delay, so that a first group of the set of the discrete values includes channel information of a first channel from the first transmitting point to the receiving point and that a second group of the set of discrete values includes channel information of a second channel from the second transmitting point to the receiving point; a selector for selecting the first group from the set of discrete values and for selecting the second group from the set of discrete values to obtain selected groups; and a determiner for determining channel information for the plurality of channels based on the selected groups.

In accordance with a second aspect, the present invention provides an apparatus for providing a plurality of different pilot sequences to be used for channel estimation, having a calculator for calculating an $i^{th}$ value $X_i^{(\mu)}$ of a pilot sequence to be transmitted by a $\mu^{th}$ transmitting point of $N_T$ transmitting points using the equation: $X_i^{(\mu)} = e^{-j2\pi(i-1)(\mu-1)/N_T} X_i^{(s)}$ wherein $N_T$ denotes a number of transmitting points and wherein $N_T$ is greater than or equal to 3; and wherein $X_i^{(s)}$ denotes an $i^{th}$, value of a scrambling sequence, the length of the scrambling sequence being equal to the length of the pilot sequence.

In accordance with a third aspect, the present invention provides an apparatus for providing a number of different pilot sequences to be used for channel estimation, having a generator for generating a Hadamard matrix having a number of columns, the number of columns corresponding to the number of different pilot sequences; a calculator for calculating the different pilot sequences based on the columns of the Hadamard matrix, wherein each pilot sequence is derived from another column of the Hadamard matrix.

In accordance with a fourth aspect, the present invention provides a method for estimating a plurality of channels from a plurality of distinct transmitting points to a receiving point, wherein an input signal includes a superposition of a first signal based on a first pilot sequence transmittable from a first transmitting point and a second signal based on a second pilot sequence transmittable from a second transmitting point, the first pilot sequence and the second pilot sequence being orthogonal to each other within a predetermined orthogonality range and having a phase shift to each other, with the steps of transforming the input signal into a transformed signal having a set of discrete values by translating the phase shift between the first and the second pilot sequence into a delay, so that a first group of the set of discrete values includes channel information of a first channel from the first transmitting point to the receiving point and that a second group of the set of discrete values includes channel information of a second channel from the second transmitting point to the receiving point; selecting the first group from the set of discrete values and selecting the second group from the set of discrete values to obtain selected groups; determining channel information for the plurality of channels on the basis of the selected groups.

In accordance with a fifth aspect, the present invention provides a method for providing a plurality of different pilot sequences to be used for channel estimation, with the steps of calculating an $i^{th}$ value $X_i^{(\mu)}$ of a pilot sequence to be transmitted by a $\mu^{th}$ transmitting point of $N_T$ transmitting points using the equation $X_i^{(\mu)} = e^{-j2\pi(i-1)(\mu-1)/N_T} X_i^{(s)}$, wherein $N_T$ denotes a number of transmitting points and wherein $N_t$ is greater than or equal than 3; and wherein $X_i^{(s)}$ denotes an $i^{th}$ value of a scrambling sequence, the length of which being equal to the length of the pilot sequences.

In accordance with a sixth aspect, the present invention provides a method for providing a number of different pilot sequences to be used for channel estimation, with the steps of generating a Hadamard matrix having a number of columns, the number of columns corresponding to the number of different pilot sequences; calculating the different pilot sequences based on the columns of the Hadamard matrix, wherein each pilot sequence is derived from another column of the Hadamard matrix.

In accordance with a seventh aspect, the present invention provides a computer program having a program code for performing one of the above methods when the program runs on a computer.

The present invention is based on the finding that a channel estimation based on orthogonal and phase-shifted pilot symbols with respect to each other can efficiently be performed by translating the phase shifts into delays, wherein an input signal including a superposition of a plurality of signals based on the pilot sequences transmitted through a plurality of communication channels is transformed into a transformed signal, so that the phase shifts between the plurality of pilot symbols are translated into delays. Hence, a set of discrete values of the transformed signals can be divided into a plurality of groups, each group having a delay with respect to the preceding groups, wherein each group represents channel information of a channel. In particular, it has been found that a single transformer can be applied for transforming the phase shifts into delays, since the delayed groups actually include channel information, i.e. a channel impulse response of a communication channel, when a phase shift to delay transform is performed. Therefore, by exploiting the distinct delays in order to select the groups, the channel information can be obtained directly from the selected groups using only a single transformer.

For the sake of simplicity, in the following, only one receiving point being representative for the plurality of receiving points, will be discussed. However, it should be pointed out here that the following discussion and results can be applied to a plurality of receiving points in a straight-forward way. Furthermore, in the following an OFDM transmission system will be considered. However, the present invention can also be applied to channel estimation in single carrier modulation systems or in multichennel modulation techniques different from OFDM. To this end, preferably a guard interval is used so that the transmitted single carrier symbol is prevented from being affected by received signal from inter-symbol interference.

Referring again to the case of two transmitting points, an inventive apparatus for estimating a plurality of channels from a plurality of distinct transmitting points to a receiving point, derives an input signal from a signal received at the antenna of the receiving point. The input signal includes a superposition of a first signal based on a first pilot sequence transmittable from a first transmitting point and a second signal based on a second pilot sequence transmittable from a second transmitting point. The first pilot sequence and the second pilot sequence are orthogonal to each other within a predetermined orthogonality range. If the first pilot sequence and the second pilot sequence are perfectly orthogonal to each other, then an inner product of these two sequences equals 0. However, since a perfect orthogonality is difficult to achieve, it is allowable that an absolute value of an inner product of the first pilot sequence and of the second pilot sequence is greater than or equal to 0 but preferably smaller than 0.2. Hence, the predetermined orthogonality range is defined by an interval having a first value equal to 0 and the last value equal to 0.2.

If the first and the second pilot sequences have an additional phase shift to each other, then a transformer for transforming the input signal into a transformed signal translates the phase shifts into a delay, so that a first group of a set of discrete values of the transformed signal includes channel information of a first channel from the first transmitting point to the receiving point and a second group of the set of discrete values includes channel information of a second channel from the second transmitting point to the receiving point. Hence, as stated above, the first channel information is extracted simply by selecting the first group from the set of discrete values and the second channel information is extracted by selecting the second group from the set of discrete values. In order to obtain selected groups, the inventive apparatus further comprises a selector for selecting the first and the second group based on the delay between the first and the second group. Based on the selected groups, the channel information can be determined by a means for determining channel information.

In accordance with the present invention, an input signal is transformed by the transformer to translate the phase shift into a delay. Preferably, the transformer is operative to perform a Fourier transform, since a phase shift in the frequency domain is translated to a delay in the time domain by, for example, an inverse discrete Fourier transform and vice-versa. So if the pilot sequences are phase-shifted in the frequency domain, the resulting time domain signal after the inverse Fourier transform will be delayed. Furthermore, by assigning a certain phase shift to each pilot sequence, the corresponding delay in the time domain will be dependent on the transmit antenna. Provided that $N'_P \geq N_T Q$, wherein $N'_P$ denotes a number of discrete values of the input signal, and by using appropriate sets of phase shifted sequences, the $N_T$ superimposed signals can be simply separated by performing an inverse discrete Fourier transform.

While the estimator front and disclosed by Li et al requires pre-multiplications and a plurality of IDFT operations, only one IDFT operation is required to separate $N_T$ superimposed signals by the inventive estimation scheme. The remaining part of the receiver will not be affected by this modification. Although certain phase-shifted sequences are perfectly suited in time-domain for OFDM channel estimation, other orthogonal sequences, such a sequences derived from Hadamard matrices, may be also be applied to the proposed simplified receiver structure, with some modifications resulting in a modest additional processing in time domain, which will be described later.

In general, a significant improvement of the proposed receiver structure compared to the prior art receiver structure is the simplification of the estimator front-end. This simplification has no negative effects on the performance of the channel estimator. Moreover, if the phase shifted pilot sequences are appropriately designed, then the channel estimation scheme can further be simplified, since phase shifted pilot sequences are a perfect match to a Fourier transform in terms of separating the $N_T$ superimposed signals without any substantial further processing.

In addition, an increasing number of transmitting points has only a slight impact on a complexity of the inventive channel estimation scheme, since irrespective of the number of transmitting points, only one transformer is required to transform the input signal into transformed signal so that the phase shifts are translated into delays. Accordingly, only one selector is applied to select the selected groups. This is a significant complexity reduction compared to the prior art discussed above, since the complexity of the prior art channel estimation scheme rapidly increases with an increasing number of transmitting points due to the required plurality of IDFT transformers in order to transform the plurality of (premultiplied) copies of the received signal and in order to obtain a further plurality of intermediate values required by the plurality of channel estimation blocks.

Furthermore, the inventive apparatus does not comprise any splitting means since only one input signal is directly transformed which leads to a further complexity reduction. Moreover, since only one transformer is used, an optional preprocessing of the input signal prior to transformation (windowing, zero padding etc.) is simpler.

Furthermore, due to the inventive channel estimation scheme, significantly less multiplications or no multiplications at all have to be performed which leads to a further significant complexity reduction when the input signal is not pre-multiplied by a plurality of complex conjugated pilot sequences. If the pilot sequences are pre-multiplied by a scrambling sequence in order to achieve better transmission characteristics of the signal to be transmitted, then only the values of one input signal have to be pre-multiplied for removing the influence of the scrambling sequence. If no pre multiplying is performed, then no multiplications prior to transforming are necessary. On the contrary, the prior art channel estimation scheme always requires a plurality of multiplications as described above.

Furthermore, the inventive channel estimation scheme is simplified since the transformed signal contains actually the channel information. Therefore, no matrix inversions or matrix by vector multiplications are necessary which further reduces the complexity.

Moreover, the inventive channel estimation scheme can be applied to any orthogonal sequences having different phase shifts to each other provided that these phase shifts are known at the transmitting point. Since these different phase shifts are transformed into delays, the inventive selector can always select proper groups from a plurality of delayed discrete values even when the discrete values belonging to a particular group are not succeeding each other.

Moreover, the performance of the proposed channel estimation scheme can be further increased by providing a plurality of different pilot sequences in accordance with a further embodiment of the present invention. In order to calculate an $i^{th}$ value of a pilot sequence to be transmitted by a transmitting point from a number of transmitting points, the inventive apparatus for providing a plurality of different pilot sequences comprises a means for calculating a pilot sequence being operative to generate predetermined phase shifts between succeeding values of the pilot sequence to be transmitted and predetermined phase shifts between the pilot sequences as well.

To be more specific, the phase shifts between succeeding values of the pilot sequence to be transmitted are generated such that the phase shift between successive values of the pilot sequence is negative in a mathematical sense. Furthermore, the phase shift between the succeeding values depends on a number associated with the corresponding value in the pilot sequence.

In addition, in order to generate phase shifts between the plurality of pilot sequences, the phase shifts between succeeding values in a particular pilot sequence also depends on a number assigned to a transmitting point, the number being divided by a total number of transmitting points. Moreover, the generated pilot sequences are preferably scrambled by the same scrambling sequence, the length of the scrambling sequence being equal to the length of the pilot sequences, wherein each value of the pilot sequence to be generated is multiplied by a corresponding value of the scrambling sequence. Hence, all pilot sequences include the same possibly complex valued scrambling sequence introducing an additional phase shift and amplitude modulation. Therefore, at the receiving point, the additional phase shift introduced by the scrambling sequence can be removed by applying a single multiplier by simply multiplying the input signal by a complex conjugated version of the scrambling sequence. Moreover, the inventive phase shift between each succeeding value of each pilot sequence is suited to an inverse discrete Fourier transform in order to translate the phase shifts into delays, since the inventive phase shift between succeeding values of each pilot sequence to be transmitted is negative in a mathematical sense and is hence a perfect counterpart of the IDFT (translating phase shifts into delays) since the IDFT introduces a phase shift in a positive mathematical sense. Hence, a simplified DFT based channel estimation scheme can be performed.

Moreover, in order to simplify the channel estimation scheme used at the receiving point, suitable orthogonal sequences can be used as pilot sequences (pilot symbols). In accordance with a further embodiment of the present invention, an apparatus for providing a number of different pilot sequences to be used for channel estimation comprises means for generating a Hadamard matrix having a number of columns, each column being orthogonal to the other columns, wherein the number of columns corresponds to the number of different pilot symbols. Based on the columns of the Hadamard matrix, the different pilot sequences can be calculated by, for example, a cyclic extension of each column of the Hadamard matrix, wherein each pilot sequence is derived from another column of the Hadamard matrix. Since the generated pilot sequences have a predetermined phase shift to each other, these phase shifts translated into delays at the receiver by, for example, applying an inverse discrete Fourier transform to obtain discrete values and to select groups containing channel information from the delayed discrete values. Moreover, this approach is suited for multi-carrier code division multiplex access transmission systems (MC-CDMA), where spreading in frequency direction is introduced in addition to the OFDM modulation. In order to introduce spreading in frequency direction, orthogonal signals based on columns of a Hadamard matrix can be applied, which simplifies a channel estimation procedure, since the same sequence can be applied for spreading in the frequency direction and for reduced complexity channel estimation. The inventive approach is also suited for channel estimation in multiple access transmission systems, like FDMA (frequency division multiple access) or TDMA (time division multiple access).

BRIEF DESCRIPTION OF THE DRAWINGS

Further embodiments of the present invention are described in detail with respect to the following figures, in which.

DESCRIPTION OF THE PREFERRED EMBODIMENTS

Figure 1:
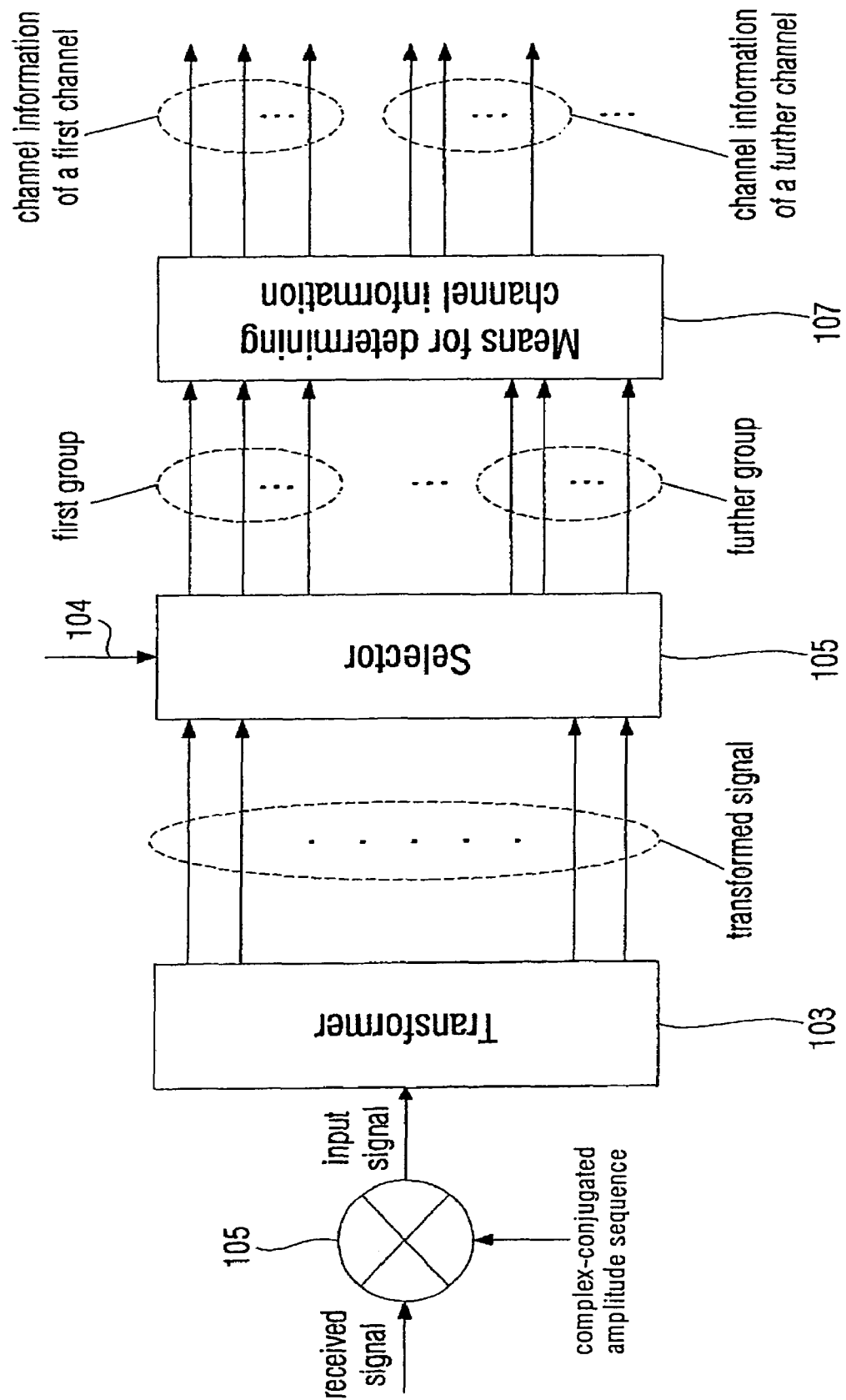
FIG. 1 shows a block diagram of an inventive apparatus for estimating a plurality of channels.

The apparatus shown in FIG. 1 comprises a multiplier 101 having two inputs and one output. The output of the multiplier 101 is connected to a transformer 103 having a plurality of outputs for providing a transformed signal. The plurality of outputs of the transformer 103 is connected to a selector 105 having a control input 104 providing a delay information for proper group selection. The selector 105 has a plurality of outputs, wherein a number of outputs is equal to a number of inputs of the selector 105 and, thus, equal to a number of outputs of the transformer 103. The plurality of outputs of the selector 105 is connected to a means 107 for determining channel information, the means 107 having a plurality of outputs.

The apparatus shown in FIG. 1 demonstrates the inventive low complexity channel estimation scheme based on pilot signals being orthogonal to each other within the predetermined orthogonality range and having a phase shift to each other. If the pilot sequences comprised of pilot symbols, each of the pilot sequences corresponding to one of a plurality of transmitting points, are scrambled by the same complex amplitude sequence, then the pilot sequences include a complex amplitude sequence and phase information. The transmitting points then transmit signals based on the pilot sequences through a plurality of communication channels, wherein prior to transmitting, the pilot sequences are modulated using, for example, an OFDM modulation scheme. A signal received at a receiving point (not shown in FIG. 1) includes a superposition of the plurality of transmitted signals and possibly a plurality of superimposed distortion signals representing channel noise. After a demodulation performed by applying an OFDM demodulation scheme, a received signal shown in FIG. 1 is obtained. The multiplier 101 is, hence, operative to multiply the received signal by a complex conjugated version of the amplitude sequence (scrambling sequence) in order to remove the amplitude information and phase shift introduced to each of the pilot sequences by scrambling. The received signal is a set of successive discrete received signal values and the multiplier 101 is operative to perform a single complex multiplication for each value of the set of successive discrete received signal values and a corresponding value of a set of successive discrete complex conjugated amplitude signal values, so that after a number of single complex multiplications, a set of successive discrete input values of an input signal is obtained.

The input signal includes a superposition of signals based on a plurality of pilot sequences, for example, based on a first, a second and a third pilot sequence being transmitted from a first, a second and a third transmitting point. Hence, the input signal contains phase shifts of the pilot sequences, wherein the phase shifts are not removed by further pre-multiplications. Instead, the input signal is provided to the transformer 103 being operative to translate the phase shifts into delays.

The transformer 103 can be any transformer being able to translate phase shifts into delays. For example, the transformer 103 performs a Fourier transform or a fast Fourier transform or a discrete Fourier transform or an inverse Fourier transform or an inverse fast Fourier transform or an inverse discrete Fourier transform of the input signal. In particular, the input signal is a set of successive input signal values and the transformer is operative to transform the set of successive input signal values into the transformed signal, which is a set of discrete values, wherein a total number of discrete values of the set of discrete values of the transformed signal is equal to a total number of input signal values in the set of input signal values.

Hence, the transformer is operative to perform a single transform algorithm applied to the set of discrete values, wherein the transform algorithm can be, for example, one of the algorithms mentioned above applied to the total number of input signal values. The length of the input signal corresponds to a length of a training or pilot sequence multiplied by a total number of transmitting points.

Hence, the length of the transformed signal is equal to the length of the input signal.

The selector 105 selects a number of groups, the number of groups being equal to the total number of transmitting points in order to obtain selected groups, wherein each group consists of an equal number of successive discrete values of the set of discrete values of the transformed signal. The selector is operative to select, as a group, a number of successive discrete values, wherein the number of successive discrete values is equal to the total number of discrete values of the transformed signal divided by the total number of transmitting points, wherein the total number of discrete values is obtained by the transformer.

For example, the selector is operative to select groups such that a first discrete value of the set of discrete values is a first discrete value in a first group at the output of the selector and a first discrete value of a second group of discrete values is a discrete value in the set of discrete values succeeding a discrete value having the highest order of the values selected to obtain the first group, wherein the first group and the second group have corresponding distinct delays, the delays being obtained by the transformer. If the input signal includes, in a superimposed manner, a third signal based on a third pilot sequence transmittable from a third transmitting point, the transformer translates a further phase shift of the third group into a further delay, so that a third group of the set of discrete values includes channel information of a third channel from the third transmitting point to the receiving point and the selector selects the third group from the set of discrete values to obtain a selected third group having a further delay associated with the third group. Hence, if the input signal includes a plurality of superimposed signals corresponding to a plurality of transmitting points, the selector 105 selects a further group of the plurality of groups on the basis of a delay corresponding to the further group as depicted in FIG. 1.

The groups being selected by the selector based on a delay information via the control input 104 or based on a fixed setting (no control input is required in this case) are provided to the means 107 for determining channel information based on the selected groups. If the pilot symbols are orthogonal to each other within the orthogonality range and if the pilot symbols have a predetermined phase shift with respect to each other, then each of the selected groups contains channel information corresponding to a particular channel from a particular transmitting point to the receiving point. In this case, the means 107 is operative to receive the selected groups and to output the selected groups, since each of the groups includes channel information of the particular channel, as will be shown later. In order to output the selected groups, the means 107 can be designed in such a way that the inputs of the means 107 are directly connected to the outputs of the means 107. If there is no channel noise or if the channel noise is negligible, then the means 107 for determining channel information outputs the selected groups, each group including, for example, a channel impulse response of a particular channel as channel information. Furthermore, the means 107 can include a time frequency conversion means, for example, a DFT based transformer for obtaining a channel transfer function by transforming the determined channel impulse response of a particular channel into the frequency domain in order to obtain the channel transfer function as the channel information.

Depending on pilot sequences applied to channel estimation, a group of the selected groups and a further group of the selected groups may include channel information of a channel and channel information of a further channel in a superimposed manner. Furthermore, depending on the design of pilot sequences, a group of the selected groups may include a superposition of the channel information of a channel being multiplied by a phase shift factor and of a further channel information of a further channel being multiplied by a further phase shift factor, wherein a further group of the selected groups may include a superposition of the channel information of the channel being multiplied by the complex conjugated phase shift factor and of the further channel information of the further channel being multiplied by the complex conjugated further phase shift factor, wherein the phase shift factor and the further shift factor are caused by the design of the pilot sequences. In this case, the means 107 is operative to determine the channel information of the channel and the further channel information of the further channel using the group and the further group by, for example, solving a set of linear equations and removing the additional phase shift factors. For example, the means 107 applies phase shift operations and additions and/or subtractions to the group and to the further group in order to determine channel information. If, for example, pilot sequences based on columns of a Hadamard matrix are applied to channel estimation, then the phase shift factor is a function of a phase shift of 180° divided by the total number of transmitting points. Using this information, the known phase shifts are removed to determine the channel information.

If the channel noise cannot be neglected, then the channel information in the selected groups is affected by a distortion signal related to channel noise. In order to suppress the distortion signal, the means 107 may comprise an estimator being operative to estimate the channel information from the corrupted channel information by, for example, applying a minimum mean squared error (MMSE) estimator, a least squares (LS) estimator, a maximum-likelihood (ML) estimator or a maximum a posteriori (MAP) estimator (being a particular embodiment of a ML estimator). If the MMSE estimator is applied to estimate channel information, then the estimator performs filtering of the corrupted channel information, wherein the filter has filter coefficients, wherein each filter coefficient is determinable from a multiplication of a first matrix by a second matrix, wherein the first matrix is a cross-correlation (in general: cross-covariance) matrix between channel information and corrupted channel information and the second matrix is an inverse of an autocorrelation (in general: auto-covariance) matrix of the corrupted channel information.

The pilot sequences applied to channel estimation in an OFDM transmission system are commonly used to modulate discrete carriers in a multi-carrier modulation scheme at a predetermined time instant corresponding to the time instant at which pilot sequences are to be transmitted. Hence, the inventive apparatus may further comprise a controller for detecting the input signal in a received signal and for enabling the transformer, the selector or the means for detecting only when the input signal including pilot sequences is detected in the received signal.

Alternatively, the pilot sequences can be used to modulate the same pilot carrier in a multi-carrier modulation scheme in order to estimate time varying coefficients of a channel transfer function of a communication channel, wherein the coefficients of the channel transfer function are determined by the pilot carrier. Hence, the inventive apparatus can comprise a controller for detecting the pilot carrier in a received signal, including successive multi-carrier modulated symbols and for collecting values of the pilot carrier at time instants corresponding to the transmitting instants to obtain the input signal, wherein the channel information obtained by processing the input signal using the transformer selector and the means for detecting includes a behaviour of a multi-carrier channel from transmitting points to receiving points defined by the pilot carrier over time. The channel information including the behaviour of the multi-carrier channels is, for example, related to a velocity of a mobile receiver causing, for example, a Doppler shift related to the relative velocity between transmitter and receiver. In order to estimate the Doppler shift, changes of a coefficient of the channel transfer function over time can be exploited.

If the pilot sequences are transmitted at distinct time instances and are not succeeding each other, preferably an interpolation is performed in order to obtain intermediate values of channel information between time instances corresponding to the time instants at which pilot sequences are transmitted. Hence, the means for determining channel information may comprise a further means for interpolation being operative to interpolate between a first channel information obtained at a first time instants and a second channel information obtained at a second time instance, wherein the intermediate interpolated channel information can, for example, be determined by applying a well known Wiener interpolation technique (Wiener filter) based on the first and the second channel information or, for example, by applying a Langrange interpolation scheme.

Figure 2:
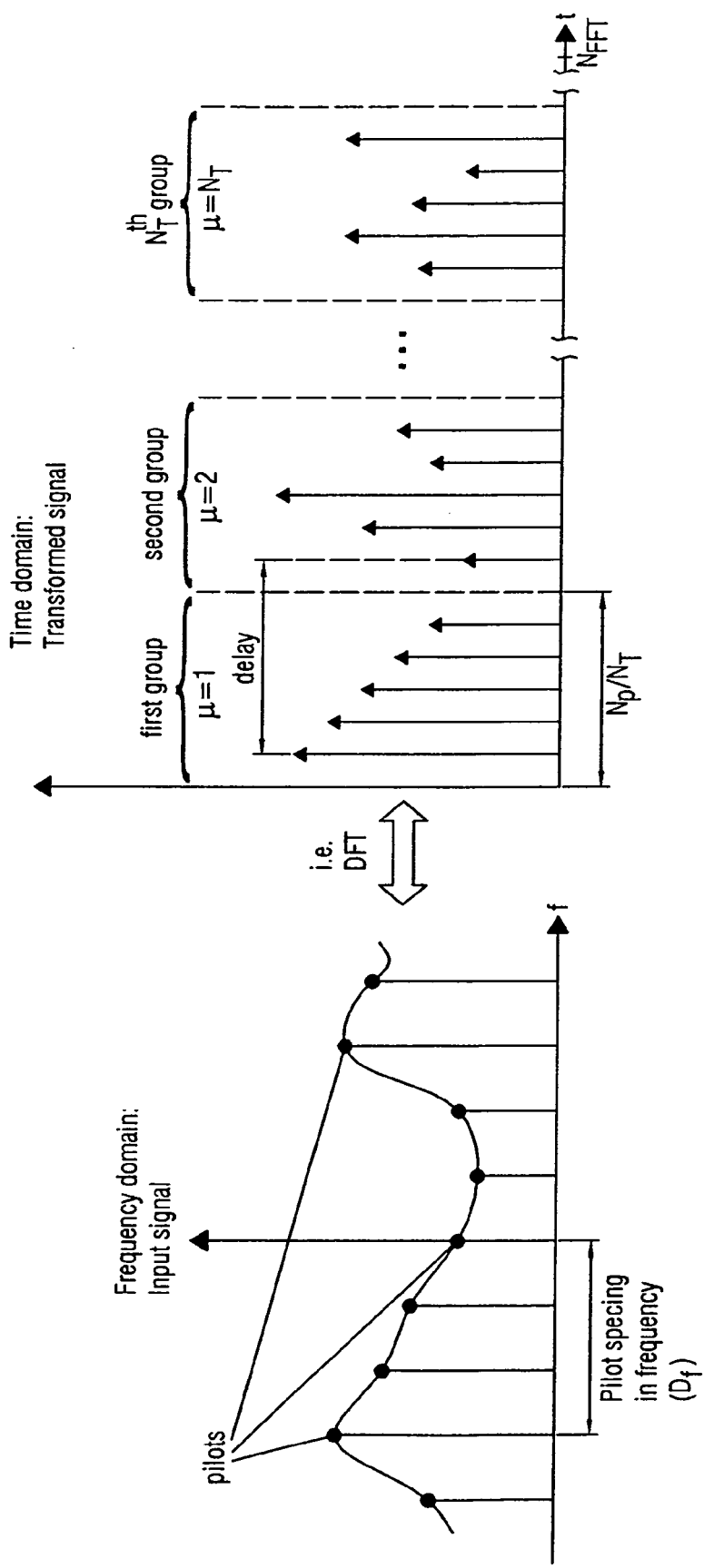
FIG. 2 demonstrates a preferred transformation of an input signal into a plurality of delayed groups.

FIG. 2 demonstrates a principle of exploiting the DFT properties by using phase-shifted sequences in the frequency domain, wherein the DFT algorithms separates $N_T$ signals in the time domain, wherein $N_T$ corresponds to a number of transmitting points. The frequency domain input signal can include pilots having a spacing in frequency denoted by $D_f$, as depicted in FIG. 2. The pilots are orthogonal to each other within the orthogonality range and have different phase shifts which can be translated into delays by applying the DFT-based transform yielding a time domain transformed signal. The transformed signal in the time domain includes $N_T$ groups including channel information like, for example, a channel impulse response of a particular communication channel. Each of the groups includes $N_p/N_T$ discrete values, wherein $N_p$ denotes a total length of the input signal. The groups transformed by the transformer are time-delayed, wherein a second group has a delay with respect to a first group, so that the discrete values of the second group do not overlap with the discrete values of the first group. Accordingly, the $N_T^{th}$ group corresponding to the $N_T$ transmitting point has the same delay with respect to a preceding group. $N_{FFT}$ denotes a number of discrete FFT points being dependent on the pilot spacing in frequency domain.

It is well known that a very efficient implementation of the DFT is the fast Fourier transform (FFT) algorithm. For optimum efficiency, the number of points of the FFT should be a power of 2. It is important to note that the interpolation ratio should be $D_f$.

Figure 3:
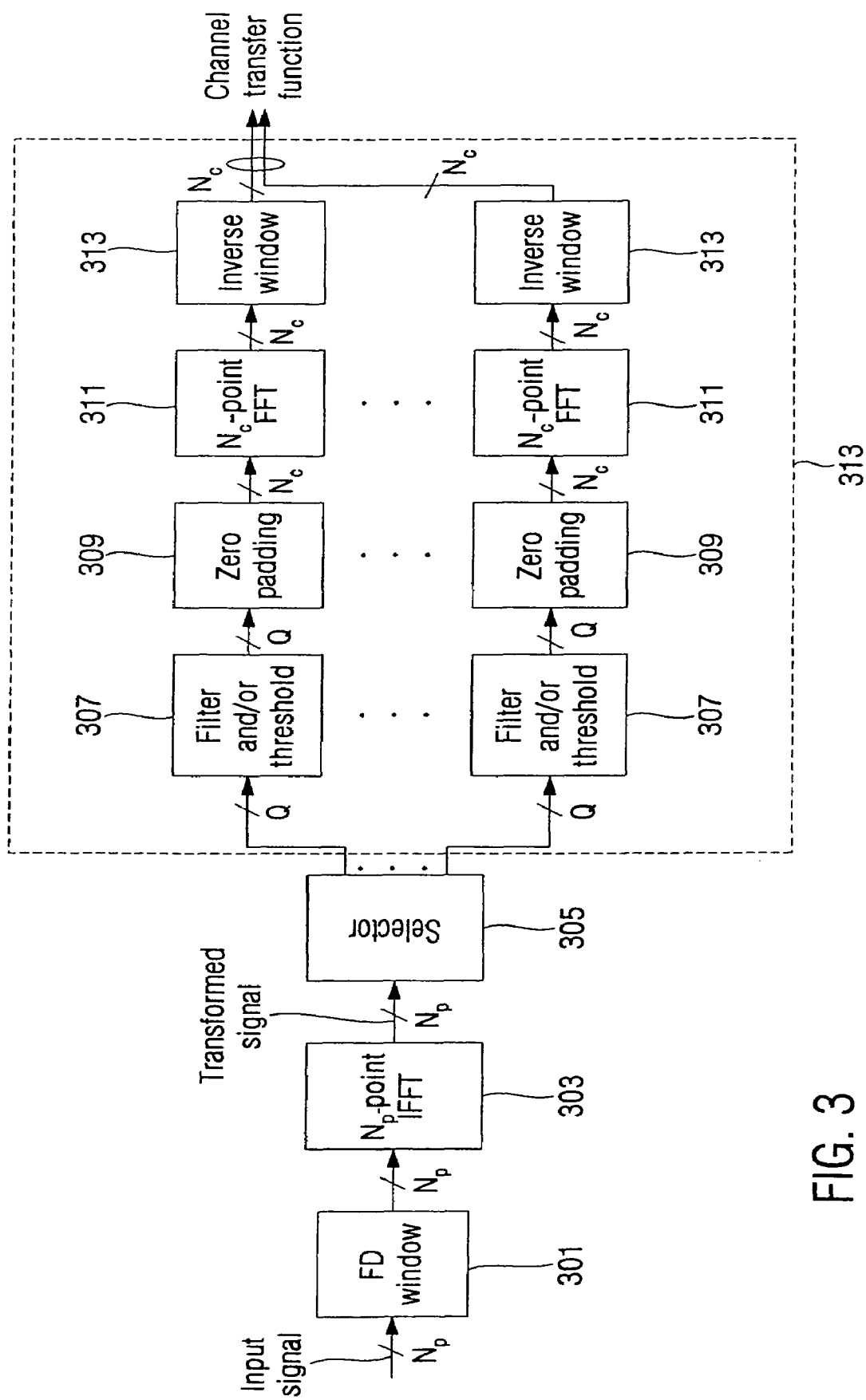
FIG. 3 shows a block diagram of an further inventive apparatus for providing a plurality of different pilot sequences.

FIG. 3 shows a conceptual block diagram of an inventive apparatus for estimating a plurality of channels from a plurality of distinct transmitting points to a receiving point.

The apparatus shown in FIG. 3 comprises a frequency domain (FD) window 301 having $N_P$ inputs corresponding to $N_P$ discrete values of an input signal provided to the frequency window 301 and $N_P$ outputs connected to a $N_P$-IFFT transformer 303. The IFFT transformer 303 has $N_P$ outputs connected to a selector 305. The selector 305 has a plurality of outputs, wherein each succeeding group of Q outputs is connected to a corresponding filter and/or threshold means 307. Each of the filter means 307 has Q outputs connected to a corresponding zero padding means 309, wherein each of the zero padding means 309 has $N_c$ outputs connected to a corresponding $N_c$-point FFT transformer 311 of a plurality of FFT transformers. Each of the FFT transformer 311 has $N_c$ outputs connected to a corresponding inverse window means 313, each of the inverse window means 313 having $N_c$ outputs. The plurality of the filter means 307, the plurality of the zero padding means 309, the plurality of the FFT means 311 and the plurality of the inverse window means 313 are part of a means 315 for determining channel information of the plurality of channels based on the selected groups in accordance with a further embodiment of the present invention.

The $N_P$ discrete values of the input signal are first windowed by the frequency domain window means 301 in order to avoid leakage affects which can be caused by the following IFFT transformation performed by the IFFT transformer 303. The inventive apparatus comprises single means 301 for windowing the input signal to obtain a windowed input-signal to be used as the input signal for the transformer. The input signal includes a plurality of pilot sequences having different phase shifts with respect to each other, wherein each of the pilot sequences corresponds to a transmitting point, transmitting the pilot sequence for channel estimation.

The IFFT transformer 303 translates the phase shifts into delays by performing an IFFT transform applied to the $N_P$ values of the input signal in order to obtain a transformed signal. It is to be remarked here that the IFFT transformer 303 performs a single IFFT algorithm applied to the input signal. Hence, the transformed signal consists of successive $N_P$ discrete values being related to the delays.

The selector 305 selects a plurality of groups from a set of discrete values of the transformed signal, wherein each selected group of the selected groups actually includes channel information in the form of a channel impulse response of each communication channel.

Due to a possible channel noise, the channel information is corrupted by a distortion signal related to the channel noise. Hence, the selected groups are filtered by the respective filter means 307 in order to estimate the channel information from the corrupted channel information. The filter means 307 can be operative to perform a detection of the channel information from the noisy channel information. This can be performed by applying a minimum mean squared estimation by filtering the selected groups, wherein each filter means 307 comprises a filter having filter coefficients, wherein each filter coefficient can be determined from a multiplication of a first matrix by a second matrix, the first matrix being a cross-correlation matrix between channel information and the corrupted channel information and the second matrix being an inverse of an auto-correlation matrix of the corrupted channel information as described above. Alternatively, a simple threshold operation can be performed to estimate the channel information by means of hard detection. Hence, the filter means 307 outputs a plurality of channel impulse responses as channel information corresponding to each communication channel. In order to obtain a channel transfer function of a particular channel impulse response, the means 315 for determining channel information comprises means for transforming the channel impulse responses into frequency domain.

In its basic form, DFT based interpolation is performed simply by adding $N_c$-Q zeros to the channel impulse response estimate, thus extending the length of each channel impulse response to $N_c$ samples by means of zero padding by for example attaching the $N_c$-Q zeros at the end of each channel impulse response. Hence, after zero padding performed by the respective zero padding means 309, a length of each channel impulse response is extended to a total length of $N_c$. In the next step, the extended channel impulse responses in the time domain are transformed into frequency domain by applying for example a fast Fourier transform to each extended channel impulse response by the FFT means 311. In order to obtain a channel transfer function corresponding to each channel impulse response, an inverse window operation is performed in order to remove the windowing effects caused by the frequency domain window means 301.

Figure 4:
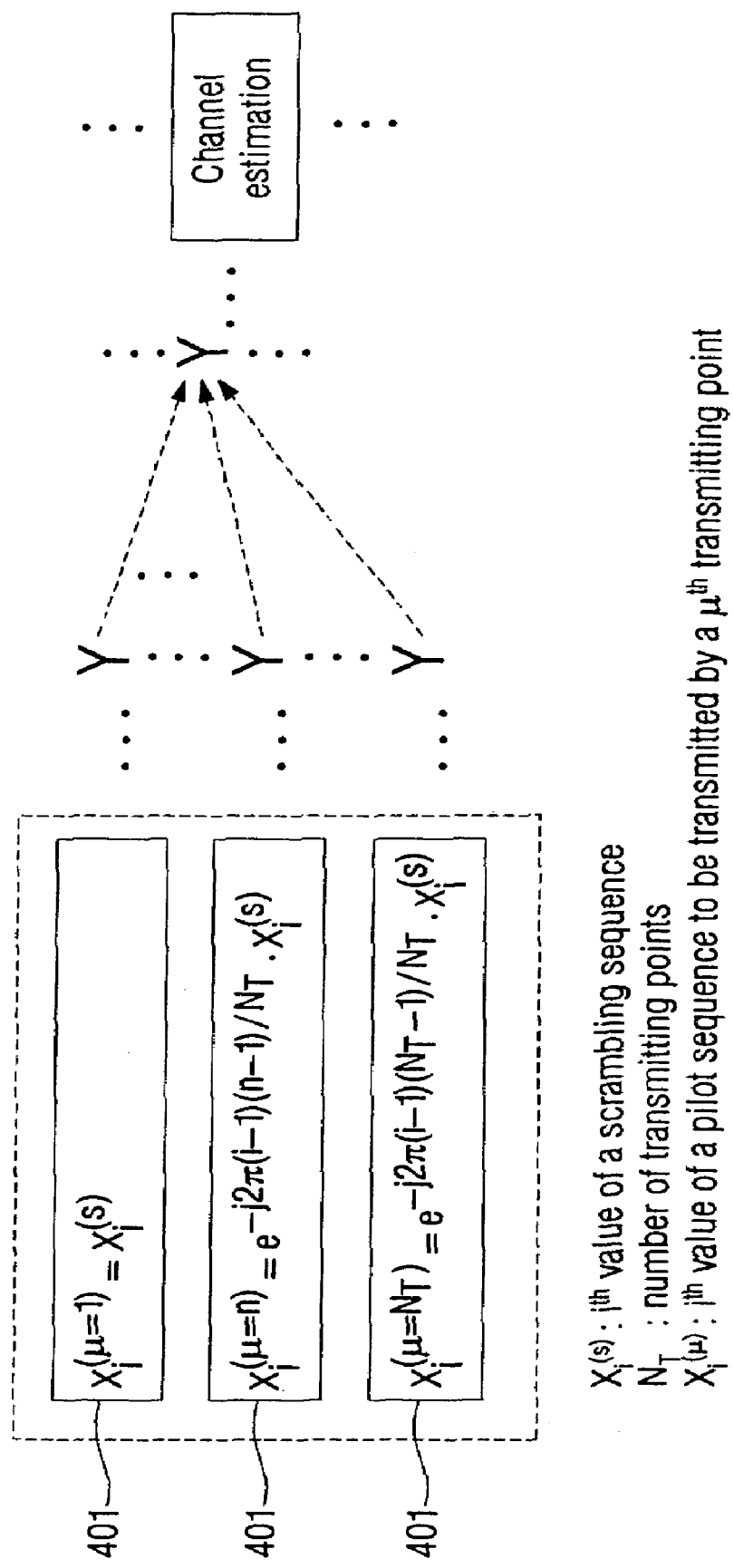
FIG. 4 shows a block diagram of a inventive apparatus for providing a number of different pilot sequences.

FIG. 4 shows a conceptual block diagram of an inventive apparatus for providing a plurality of different pilot sequences to be used for channel estimation.

The apparatus shown in FIG. 4 comprises means 401 calculating an $i^{th}$ value of a pilot sequence to be transmitted by a $\mu_{th}$ transmitting point of $N_T$ transmitting points.

In order to calculate distinct pilot sequences the means 401 uses the following equation for calculating an $i^{th}$ value $X_i^{(\mu)}$:

$$X_i^{(\mu)} = e^{-j2\pi(i-1)(\mu-1)/N_T} X_i^{(s)}$$

wherein $N_T$ denotes a number of transmitting points being greater than or equal to 3 and wherein $X_i^{(s)}$ denotes an $i^{th}$ value of a scrambling sequence, wherein a length of the scrambling sequence is equal to a length of the pilot sequence.

Hence, the pilot sequence corresponding to a first transmitting point, wherein $\mu=1$, is identical to the scrambling sequence. A $n^{th}$ pilot sequence $\mu=n$ to be transmitted by an $n^{th}$ transmitting point comprises a number of discrete values related to the phase shifts of the $n^{th}$ pilot sequence, wherein each value of the $n^{th}$ pilot sequence is multiplied by the scrambling sequence. The phase shifts of each value of the pilot sequence depend on a number of the value being calculated, wherein the number of the value is associated with a position of the value within the pilot sequence. Furthermore, the phase shift of the $n^{th}$ pilot sequence with respect to the other pilot sequence depends on a number of transmitting points divided by a total number of transmitting points $N_T$. Hence, succeeding values of each pilot sequence have a phase shift with respect to each other, wherein the phase shift is negative in a mathematical sense, due to a negative sign appearing in the exponent of the exponential function.

Hence, the pilot sequences provided by the inventive apparatus are suited for low complexity DFT based channel estimation. By using the inventive phase shifted pilot sequences, the properties of the Fourier transform can efficiently be exploited to separate the $N_T$ superimposed signals. It is well known that a phase shifted signal in the frequency domain is translated to a delay in the time domain by the Fourier transform and vice versa. So, by using phase shifted pilot sequences in the frequency domain, the resulting time domain signal will be delayed. Furthermore, by assigning a certain phase shift as described above to each transmit antenna's pilot, the corresponding delay in the time domain will be dependent on the transmit antenna. Provided that a length of each training sequence is greater than or equal to $N_TQ$, where Q denotes a length of a channel having a maximum length of the plurality of the communication channels to be estimated, the $N_T$ superimposed signals can be separated completely simply by performing an inverse discrete Fourier transform.

It has been discussed above that phase shifted pilot sequences provided by the inventive apparatus shown in FIG. 4 are suited to time domain MIMO OFDM channel estimation since these sequences are the perfect match to the IDFT operation. Nevertheless, other orthogonal sequences may also be applied to a low complexity channel estimation with some additional processing in time domain.

Figure 5:
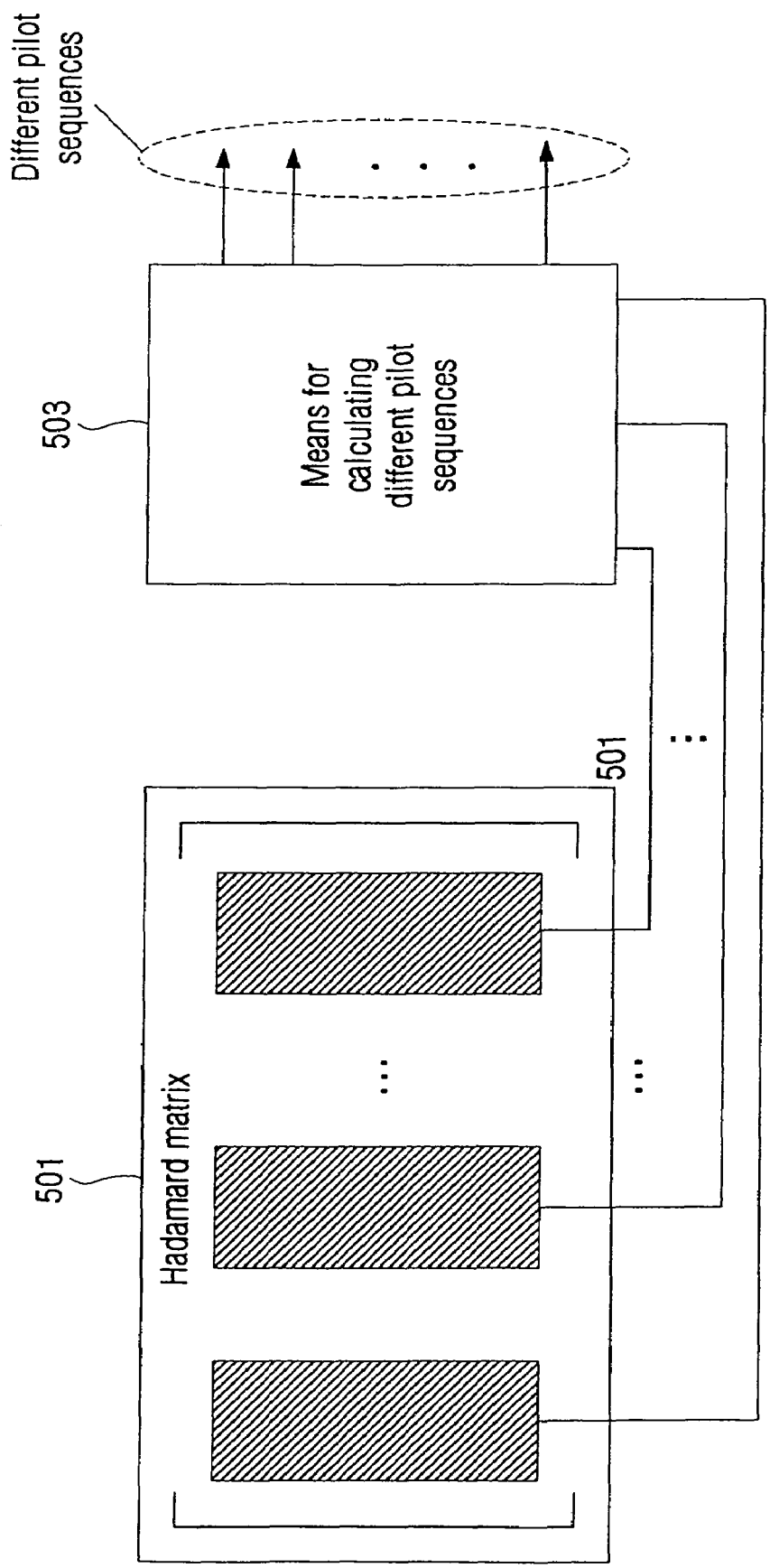
FIG. 5 shows a block diagram of a further inventive apparatus for providing a number of different pilot sequences.

FIG. 5 shows a conceptual block diagram of a further inventive apparatus for providing a number of different pilot sequences to be used for channel estimation, wherein the pilot sequences are orthogonal sequences based on columns of a Hadamard matrix.

The apparatus shown in FIG. 5 comprises a means 501 for generating a Hadamard matrix having a number of columns, wherein the number of columns corresponds to the number of different pilot sequences (pilot symbols). The means 501 has a number of outputs, the number of outputs being equal to the number of columns of the Hadamard matrix. The outputs of the means 501 are connected to a means 503 for calculating different pilot sequences. The means 503 for calculating different pilot sequences has a number of outputs for providing the different pilot sequences.

The means 501 for generating a Hadamard matrix calculates columns of the Hadamard matrix being orthogonal to each other. The number of columns of the Hadamard matrix is provided to the means 503 for calculating different pilot sequences, wherein the means 503 calculates the different pilot sequences on the basis of the columns of the Hadamard matrix. Each pilot sequence is derived from another column of the Hadamard matrix. In order to generate a pilot sequence, the corresponding column of basis functions given by the columns of the Hadamard matrix can for example be periodically extended to a pilot sequence length.

However, the inventive pilot sequences based on Hadamard codes cannot be applied to the simplified receiver structure discussed above in a straight forward way for a number of transmitting points being greater than 2. With some additional processing a channel estimation scheme based on Hadamard codes can be simplified. For example, if four transmitting points are applied to transmit pilot sequences, then a channel information determined by a DFT based channel estimation scheme has an additional phase shift factor which is a function of a phase shift of 180 degrees divided by four. Hence, the additional processing necessary to determine channel information is small since only phase shift operations, additions and subtractions are required in order to solve a set of linear equations.

If, for example, eight transmitting points are applied to transmit pilot sequences, the estimated channel information has an additional phase shift factor which is a function of a phase shift by 180 degrees divided by the total number of transmitting points which is eight in this case. Hence, only four phase shifting and four add and subtract operations are necessary. Note that application to Walsh sequences is straight forward since Walsh sequences are obtained by rearranging the columns of the Hadamard matrix, i.e. assigning different pilot sequences to the transmit antennas.

Pilot aided channel estimation (PACE) was first introduced for single carrier systems and required a flat fading channel, as described by J. K. Cavers, "An Analysis of Pilot Symbol Assisted Modulation for Rayleigh Fading Channels," IEEE Transactions on Vehicular Technology, vol. VT-40, pp. 686-693, November 1991. It is based on periodically inserting known symbols, termed pilot symbols in the data sequence. If the spacing of the pilots is sufficiently close to satisfy the sampling theorem, the channel estimation and interpolation for the entire data sequence is possible. When extending the idea of PACE to multi-carrier systems, it must be taken into account that for OFDM fading fluctuations in two dimensions occur, i.e., in time and frequency. In order to satisfy the two-dimensional sampling theorem, the pilot symbols are scattered throughout the time/frequency grid, which yields to a two-dimensional pilot grid.

Figure 6:
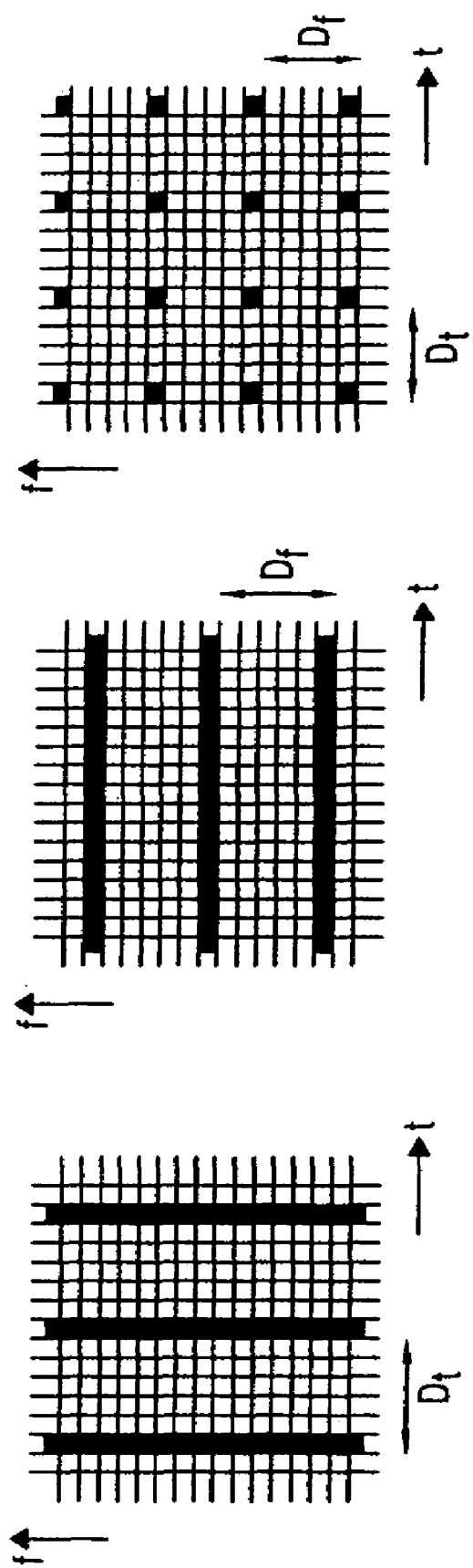
FIG. 6 shows a pilot grid structure.
Figure 7:
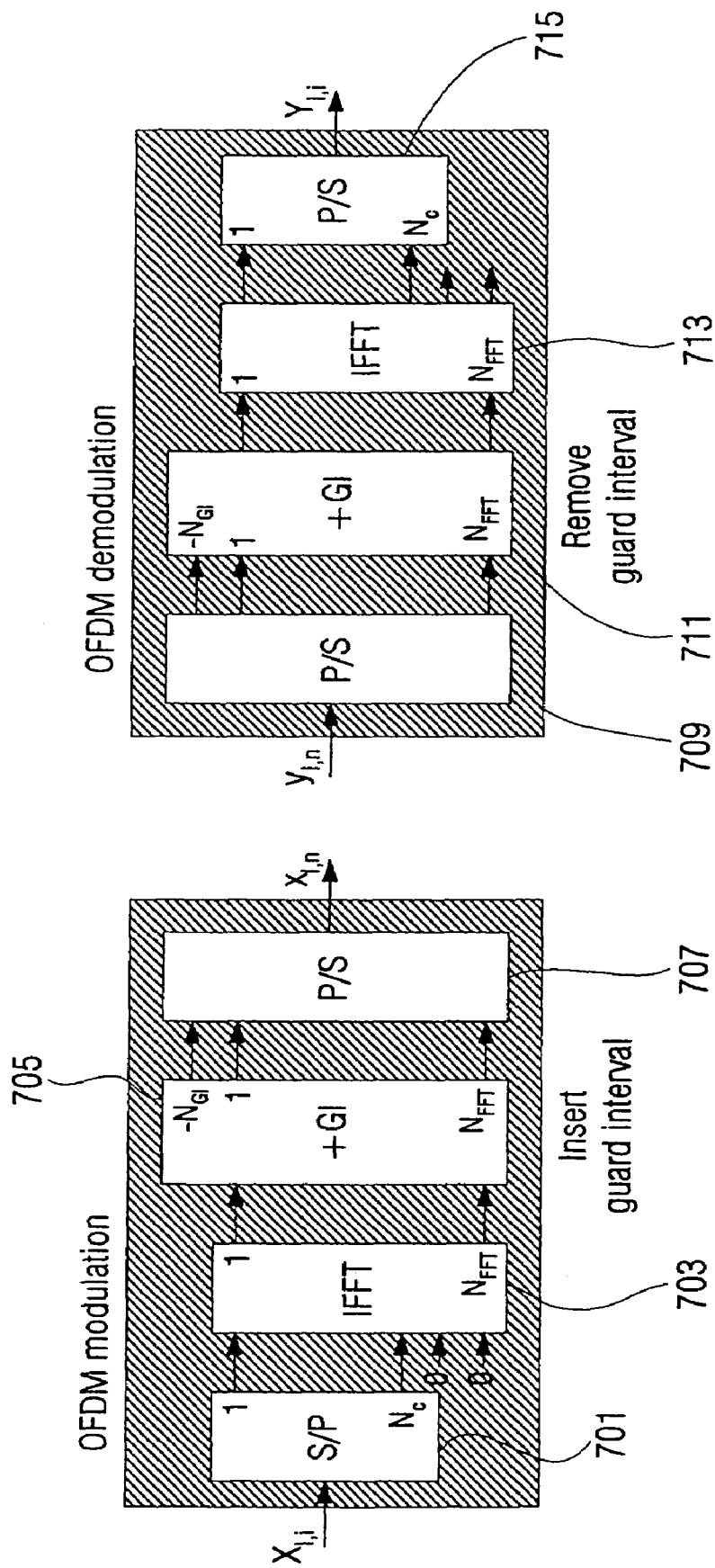
FIG. 7 demonstrates an OFDM modulation and demodulation scheme.
Figure 8:
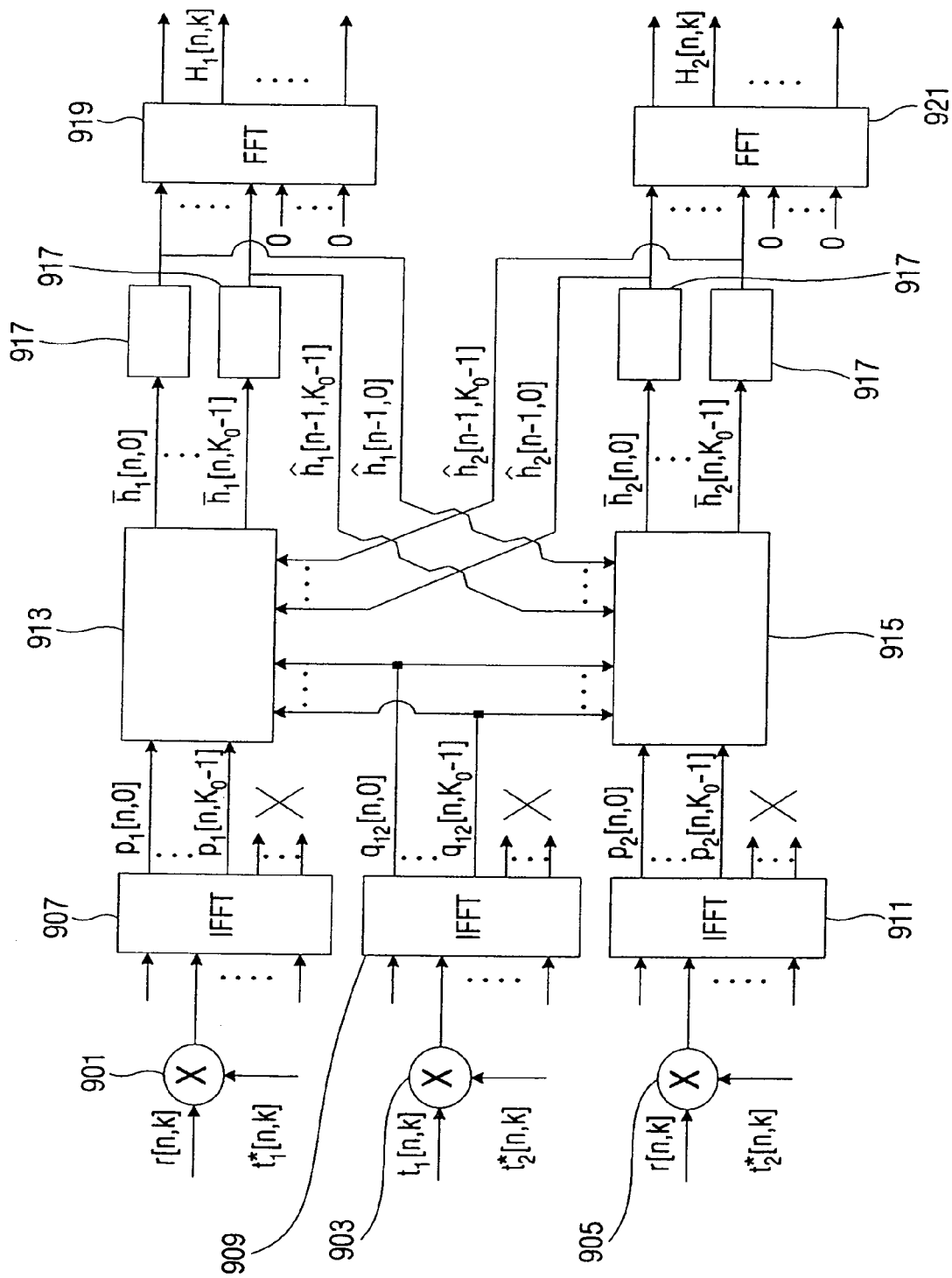
FIG. 8 shows a block diagram of prior art channel estimation schemes.

Possible realizations of pilot grid structures for OFDM channel estimation are illustrated in FIG. 6. One possibility to structure a pilot grid is to transmit one OFDM symbol containing only pilots followed by $D_t$-1 data symbols. This sequence is shown in the left diagram in FIG. 6. This scheme is applicable for channels with little time variations, as observed in an indoor environment. In this case, no interpolation (in frequency direction) is necessary. Another possibility is to transmit the pilots on reserved carriers as shown in the middle diagram in FIG. 6. This scheme can support mobility but requires interpolation in frequency direction. A more efficient solution is to employ a scattered pilot grid, as shown in the right diagram in FIG. 6. The structure for OFDM signalling allows a channel estimator to use both time and frequency correlations. With such a scattered pilot grid, the property of OFDM, that adjacent sub-carriers as well as adjacent symbols are correlated, can be exploited for channel estimation. Thus, the overhead due to pilots can be reduced but interpolation in time and frequency is required.

For pilot symbol aided channel estimation (PACE) based on a scattered pilot grid, known pilot symbols are multiplexed into the data stream. Interpolation is used to obtain the channel estimate for the information carrying symbols. PACE for single carrier systems was introduced by Cavers in the above mentioned prior art document. P. Hoeher, S. Kaiser, and P. Robertson, "Two-Dimensional Pilot-Symbol-Aided Channel Estimation by Wiener Filtering", in Proc. IEEE Intern. Conf. On Acoustics, Speech, and Signal Processing. (ICASSP'97), Munich, Germany pp. 1845-1848, 1997, and R. Nilsson, O. Edfors, M. Sandell, and P. Börjesson, "An Analysis of Two-Dimensional Pilot-Symbol Assisted Modulation for OFDM", in Proc. IEEE Intern. Conf. On Personal Wireless Communications (ICPWC'97), Mumbai (Bombay), India, pp. 71-74, 1997. They propose two-dimensional 2D filtering algorithms for PACE. Such a 2D estimator structure is generally too complex for practical implementation. To reduce the complexity, separating the use of time and frequency correlation has been proposed. This combined scheme, termed double 1-dimensional PACE uses separate Wiener filters, one in frequency direction and one in time direction.

A general formal description of a regular grid in a 2D plane can be found in Y. Li, "Pilot-Symbol-Aided Channel Estimation for OFDM in Wireless Systems", IEEE Transactions on Vehicular Technology, vol. 49, pp. 1207-1215, July 2000.

The total number of pilots transmitted by one frame is depicted as $N'_p=N_c/D_f$ and $N''_p=L/D_t$, representing the number of pilots in frequency and time direction, respectively. The following notation will be used. Given a variable describing a 2D structure X, the subsets which describe the dimension corresponding to frequency and time directions are denoted by X' and X", respectively. As a general convention, variables describing pilot symbols will be marked with a "˜" in the following For MIMO systems every transmit antenna signal uses its own pilot, to enable the receiver to separate the superimposed signals. To describe pilot symbol assisted channel estimation, it is useful to define a subset of the received signal sequence containing only pilots, $\{\tilde{X}_{\tilde{l},\tilde{i}}^{(\mu)}\}=\{X_{l,i}^{(\mu)}\}$ with $l=\tilde{l}D_t$ and $i=\tilde{i}D_f$. So, the pilot sequences transmitted at $D_f$ times lower rate $\tilde{i}=\lfloor i/D_f \rfloor$ in frequency direction, and a $D_t$ times lower rate $\tilde{l}=\lfloor l/D_t \rfloor$ in time direction, respectively. It is assumed that the pilots $\{\tilde{X}_{\tilde{l},\tilde{i}}^{(\mu)}\}$ are chosen from a phase shift keying (PSK) constellation $|\tilde{X}_{\tilde{l},\tilde{i}}^{(\mu)}|=1$. Before transmission, the pilots $\{\tilde{X}_{\tilde{l},\tilde{i}}^{(\mu)}\}$ are multiplied by an outer pilot sequence $\{\tilde{X}_{0_{\tilde{l},\tilde{i}}}\}$ which is identical for all transmit antennas to yield the transmitted pilot sequence.

$$\tilde{X}_{T_{\tilde{l},\tilde{i}}}^{(\mu)}=\tilde{X}_{0_{\tilde{l},\tilde{i}}}\cdot\tilde{X}_{\tilde{l},\tilde{i}}^{(\mu)}$$

The outer pilot sequence $\{\tilde{X}_{0_{\tilde{l},\tilde{i}}}\}$ is chosen to have a low peak to average power ratio (PAPR) in the time domain and/or to have good correlation properties for synchronisation etc. In any case, the outer pilot sequence is introduced solely for the sake of completeness.

At the receiver, the cyclic prefix is removed and an FFT is performed to yield the received signal after OFDM demodulation. Assuming perfect synchronisation, the received signal $Y_{l,i}$ is obtained. For channel estimation, the received signals at the pilot positions are demultiplexed from the data stream, and after removing the outer pilot sequence, by dividing through $\tilde{X}_{0_{l,i}}$ the received pilot is obtained.

$$\tilde{Y}_{l,\tilde{i}} \triangleq Y_{l,i \in G} = \sum_{\mu=1}^{N_T} X_{l,i \in G}^{(\mu)} H_{l,i \in G}^{(\mu)} + N_{l,i \in G}$$

where G is the subset of the OFDM frame containing the pilots.

Considering the pilot sequence of OFDM symbol $l=ID_t$ from transmit antenna $\mu$ which can be expressed by a column size factor of size $N'_P$ $$\tilde{Y}'_{\tilde{l}} = \sum_{\mu=1}^{N_T} \tilde{X}_{\tilde{l}}'^{(\mu)} \tilde{H}_{\tilde{l}}'^{(\mu)} + \tilde{N}'_{\tilde{l}} \quad \in C^{N'_P \times 1}$$

$$= \sum_{\mu=1}^{N_T} \tilde{X}_{\tilde{l}}'^{(\mu)} \tilde{F} I_{N'_P \times Q} \tilde{h}_{\tilde{l}}'^{(\mu)} + \tilde{N}'_{\tilde{l}}$$

where the transmitted pilot sequence, the channel transfer function (CTS) and additive noise term are given by $\tilde{X}'^{(\mu)}_l = \text{diag}(\tilde{X}'_{l,1}{}^{(\mu)}, \ldots, \tilde{X}'_{l,N'_P}{}^{(\mu)}) \in C^{N'_P \times N'_P}$ $\tilde{H}'^{(\mu)}_l = [\tilde{H}_{l,1}{}^{(\mu)}, \ldots, \tilde{H}_{l,N'_P}{}^{(\mu)}]^T \in C^{N'_P \times 1}$ $\tilde{h}'^{(\mu)}_l = [\tilde{h}_{l,1}{}^{(\mu)}, \ldots, \tilde{h}_{l,Q}{}^{(\mu)}]^T \in C^{Q \times 1}$ $\tilde{N}'_l = [\tilde{N}_{l,1}, \ldots, \tilde{N}_{l,N'_P}]^T \in C^{N'_P \times 1}$ the $N'_P \times N'_P$ DFT-matrix $\tilde{F}$ transforms the CIR into the frequency domain, defined by $\{\tilde{F}\}_{i+1,n+1} = e^{-j2\pi n i/N'_P}; 0 \leq i \leq N'_P - 1, 0 \leq n \leq N'_P - 1$ In case that $Q<N'_P$, the last $N'_P-Q$ of the DFT output need to be removed, which can be formally performed by the matrix $I_{N'_P \times Q} = [I_{Q \times Q}, 0_{N'_P - Q \times Q}]^T$ of dimension $N'_P \times Q$, with entries equal to 1 at the main diagonal and 0 elsewhere. For $Q=N'_P$, the matrix $I_{N'_P \times N'_P}$ becomes the identity matrix. In practice, the DFT transformation can be efficiently generated using a $N'_P$-point FFT. In case that $Q<N'_P$, the last $N'_P-Q$ outputs are skipped.

Hence, the flowing equation follows $\tilde{Y}'_l = \tilde{X}'_l \tilde{H}'_l + \tilde{N}'_l = \tilde{X}'_l \tilde{F}_{N_T} \tilde{h}'_l + \tilde{N}'_l$ where $\tilde{X}'_l = [\tilde{X}'_l{}^{(1)}, \ldots, \tilde{X}'_l{}^{(N_T)}] \in C^{N'_P \times N_T N'_P}$ $\tilde{H}'_l = [\tilde{H}'_l{}^{(1)}, \ldots, \tilde{H}'_l{}^{(N_T)}]^T \in C^{N_T N'_P \times 1}$ $\tilde{h}'_l = [\tilde{h}'_l{}^{(1)}, \ldots, \tilde{h}'_l{}^{(N_T)}]^T \in C^{N_T Q \times 1}$ $\tilde{F}_{N_T} = \text{diag}(\tilde{F} I_{N'_P \times Q}, \ldots, \tilde{F} I_{N'_P \times Q}) \in C^{N_T N'_P \times N_T Q}$ Referring now to a design of phase shifted pilot sequences, the set of $N_T$ phase shifted pilot sequences of length $N'_P$ is defined by $\tilde{X}_{l,\tilde{i}}{}^{(\mu)} = e^{-j2\pi (\tilde{i}-1)\cdot(\mu-1)/N_T}; \mu=\{1,\ldots,N_T\}, \tilde{i}=\{1,\ldots,N'_P\}$ wherein the pilot sequences defined by the above equation are in accordance with the preferred embodiment according to the present invention.

In stead of pre-multiplying the received signal prior to the IDFT operation, the received pilot signal of OFDM symbol $l=ID_f$, $\tilde{Y}'_l$ is directly transformed into the time domain:

$$\zeta_{\tilde{l}} \triangleq$$

$$\frac{1}{N'_P} \tilde{F}^H \tilde{Y}'_{\tilde{l}} = \frac{1}{N'_P} \sum_{\mu=1}^{N_T} \tilde{F}^H \tilde{X}_{\tilde{l}}'^{(\mu)} \tilde{F} I_{N'_P \times Q} \tilde{h}_{\tilde{l}}'^{(\mu)} + \frac{1}{N'_P} \tilde{F}^H \tilde{N}'_{\tilde{l}} \quad \in C^{N'_P \times 1}$$

Hence, only one IDFT is required to generate $\zeta_l$

As to the properties of the DFT, phase shifted sequences are transformed by the DFT to a time shift. By assigning each transmit antenna its own phase shift, the time domain signal $\zeta_l$ is separated perfectly if $Q \leq N'_P/N_T$.

In order to analyse the following equation, it is useful to examine the components of the vector $\zeta_l$ appearing in the above equation. The $n^{th}$ entry of $\zeta_l$ is in the form $$\zeta_{\tilde{l},n} \triangleq \frac{1}{N'_P} \sum_{\tilde{i}=1}^{N'_P} \tilde{Y}_{\tilde{l},\tilde{i}} e^{j2\pi (\tilde{i}-1)\cdot(n-1)/N'_P} \quad n=\{1,\ldots,N'_P\}$$

$$= \frac{1}{N'_P} \sum_{\tilde{i}=1}^{N_P} \sum_{\mu=1}^{N_T} \tilde{X}_{\tilde{l},\tilde{i}}^{(\mu)} e^{j2\pi(\tilde{i}-1)\cdot(n-1)/N'_P} \sum_{q=1}^{Q} \tilde{h}_{\tilde{l},q}^{(\mu)} e^{-j2\pi(\tilde{i}-1)\cdot(q-1)/N'_P} +$$

$$\frac{1}{N'_P} \sum_{\tilde{i}=1}^{N'_P} \tilde{N}_{\tilde{l},\tilde{i}} e^{j2\pi(\tilde{i}-1)\cdot(n-1)/N'_P}$$

$$= \frac{1}{N'_P} \sum_{\mu=1}^{N_T} \sum_{q=1}^{Q} \tilde{h}_{\tilde{l},q}^{(\mu)} \sum_{\tilde{i}=1}^{N'_P} \tilde{X}_{\tilde{l},\tilde{i}}^{(1)} e^{j2\pi(\tilde{i}-1)\cdot(n-q)/N'_P} + \tilde{n}_{\tilde{l},n}$$

$$= \frac{1}{N'_P} \sum_{\mu=1}^{N_T} \sum_{q=1}^{Q} \tilde{h}_{\tilde{l},q}^{(\mu)} F_{N'_P} (\tilde{X}_{\tilde{l},\tilde{i}}^{(\mu)})_{q-n} + \tilde{n}_{\tilde{l},n}$$

Where $\tilde{n}_{l,n}$ is the IDFT of $\tilde{N}_{l,\tilde{i}}$. Hence, calculation of the DFT of the phase shifted pilot sequences in accordance with the preferred embodiment of the present invention leads to $F_{N'_P}(\tilde{X}_{l,\tilde{i}}{}^{(\mu)})_{q-n} = N'_P f_{N'_P}(n-q-(\mu-1)N'_P/N_T) = N'_P \delta_{n-q-(\mu-1)N'_P/N_T}$ It is noted that this is identical to the DFT of $\tilde{X}_{l,\tilde{i}}^{(1)*} \tilde{X}_{l,\tilde{i}}^{(\mu)}$ since $\tilde{X}_{l,\tilde{i}}^{(1)*}$ is the all one sequence. Hence, the desired result for $\zeta_{l,n}^{(\mu)}$ is obtained by $$\zeta_{\tilde{l},n} = \sum_{\mu=1}^{N_T} \sum_{q=1}^{Q} \tilde{h}_{\tilde{l},q}^{(\mu)} \delta_{n-q-(\mu-1)N'_P/N_T} + \tilde{n}_{\tilde{l},n}$$

$$= \tilde{h}_{\tilde{l},n}^{(\mu)} + \tilde{n}_{\tilde{l},n}$$

with $n=q+(\mu-1)N'_P/N_T$ and $Q \leq N'_P/N_T$

If we assume that $Q=N'_P/N_T$, column $n=q+(\mu-1)Q$ of the CIR is given by $\{\tilde{h}'_l\}_n = \tilde{h}_{l,q}^{(\mu)}$. Otherwise, if $Q<N'_P/N_T$, the size of the channel impulse response can be matched by zero padding. Hence, the following equation follows readily $\zeta_l = \tilde{h}'_l + \tilde{n}'_l = \tilde{h}'_{LS_l} N'_P \geq N_T Q$ where $\tilde{n}'_l = 1/N'_P \tilde{F}^H \tilde{N}'_l$ denotes the IDFT of the AWGN realisation $\tilde{N}'_l$, which is itself a white Gaussian noise process with the same variance. This means that the $N_T$ superimposed signals are completely separated, provided that $N'_P \geq N_T Q$.

The MMSE estimator is in general dependent on the choice of the pilot symbols. However, choosing appropriate pilot sequences, the estimator becomes independent of the transmitted pilots. It is desirable to choose a set of pilot sequences, which minimises the mean squared error (i.e. the performance of the estimator) and the computational complexity of the estimator. Hence, if the pilot sequences are appropriately chosen, the least squares estimator as well as the minimum mean square error estimator can be grossly simplified.

In order to generate the MMSE estimator, a knowledge of the correlation matrices $R'_{\zeta\zeta}$ and $R'_{h\zeta}$ are required. For the derivation of the Wiener filter it is assumed that $Q=N'_P/N_T$. Otherwise, the size of the channel impulse response can be matched by zero padding. The MMSE estimates for OFDM symbols is given by (S. M. Kay, "Fundamentals of Statistical Signal Processing: Estimation Theory", Englewood Cliffs, N.J.: Prentice Hall International, 1993)

$$\hat{h}'_i = R'_{h\zeta} R'^{-1}_{\zeta\zeta} \zeta'_i = \frac{1}{N'_P} w' \tilde{F}^H \tilde{Y}'_i$$

$$w' = R'_{h\zeta} R'^{-1}_{\zeta\zeta} \quad \in C^{N'_P \times N'_P}$$

where the correlation matrices $R'_{\zeta\zeta}$ and $R'_{h\zeta}$ are defined by $$R'_{\zeta\zeta} \triangleq E\{\zeta'_i \zeta'^H_i\} = \frac{1}{N'^2_P} \tilde{F}^H R'_{\tilde{y}\tilde{y}} \tilde{F} \quad \in C^{N'_P \times N'_P}$$

$$= R'_{\tilde{h}\tilde{h}} + \frac{N_0}{N'_P} I$$

and $$R'_{h\zeta} \triangleq E\{h'_{iD_t} \zeta'^H_i\} \quad \in C^{N'_P \times N'_P}$$

$$= R'_{\tilde{h}\tilde{h}}.$$

In order to perform MIMO OFDM channel estimation in time direction, by appropriately scaling of the parameters, the same inventive algorithms for channel estimation can be applied to DFT-based channel estimation in time direction.

In the following, the system model for equalization of $N_T$ superimposed pilot signals in time direction, i.e. the received pilot sequence of tone $\tilde{i}$ of $N''_P$ OFDM symbols is introduced. Considering channel estimation in time direction, the pilots $[Y_{1,i}, Y_{D_t,i}, \ldots, Y_{D_t N''_P,i}] \in G$ are used in order to estimate $\hat{H}_{l,i}^{(\mu)}$. In vector notation, the received pilot sequence of tone $\tilde{i}$ is defined by $$\tilde{Y}''_i = \sum_{\mu=1}^{N_T} \tilde{X}''^{(\mu)}_i \tilde{H}''^{(\mu)}_i + N''_i \quad \in C^{N_c \times 1}$$

$$= \tilde{X}''_i \tilde{H}''_i + N''_i$$

where the transmitted pilots, the general transfer function, the general impulse response and the additive noise components are given by $$\tilde{X}''_i = [\tilde{X}''^{(1)}_i, \ldots, \tilde{X}''^{(N_T)}_i] \in C^{N''_P \times N''_P N_T}, \tilde{X}''^{(\mu)}_i = \text{diag}(\tilde{X}_{1,i}^{(\mu)}, \ldots, \tilde{X}_{N''_P,i}^{(\mu)}) \in C^{N''_P \times N''_P}$$

$$\tilde{H}''_i = [\tilde{H}''^{(1)T}_i, \ldots, \tilde{H}''^{(N_T)T}_i]^T \in C^{N''_P N_T \times 1}, \tilde{H}''^{(\mu)}_i = [\tilde{H}_{1,i}^{(\mu)}, \ldots, \tilde{H}_{N''_P,i}^{(\mu)}]^T \in C^{N''_P \times 1}$$

$$\tilde{N}''_i = [\tilde{N}_{1,i}, \ldots, \tilde{N}_{N''_P,i}]^T \in C^{N''_P \times 1}$$

There are two scenarios which will be considered: first, burst like transmission where a frame of an OFDM symbol is transmitted; second, a broadcasting scenario with a continuously transmitted data stream. In burst transmission mode, L OFDM symbols are received, buffered, and after reception is complete, the whole frame is processed. This is the same as for the channel estimation in frequency direction, where all pilots of one OFDM symbol are being received together as well. The difference is that the algorithms which were applied dependent on the i variable are now used in the l variable. That is, the received pilot is transformed into the Doppler domain via an IFFT. The least squares and minimum mean squared error estimator work exactly in the same way as the previously discussed case of channel estimation in frequency direction.

Referring to the broadcasting scenario, for continuous transmission there are some differences with respect to the channel estimation in frequency direction. Some buffering is usually possible since receiving the whole sequence before processing is sometimes not feasible. $L=D_t N''_P$ is defined as the number of OFDM symbols, which are in the input buffer. For smoothing type filtering as described by S. M. Kay, "Fundamentals of Statistical Signal Processing: Estimation Theory", Englewood Cliffs, N.J.: Prentice Hall International, 1993, we use past as well as future pilots to estimate $\hat{H}_{l,i}^{(\mu)}$. This means $1 < l < D_t N''_P$. Clearly, for smoothing an estimate cannot be obtained until all pilots have been received, which requires buffering of $\Delta l = D_t N''_P - 1$ OFDM symbols. The alternative is to use prediction type filtering where $l > D_t N''_P$. In this case only past pilots are used for channel estimation in time direction. Obviously, prediction type filtering does not require any buffering, however, the performance with respect to smoothing degrades.

The major difference with respect to channel estimation in frequency direction is that only $D_t$ symbols per sub-carrier are output at a time, i.e., an input of $N''_P$ pilots is used to produce an output of $D_t$ symbols per sub-carrier. Furthermore, the number of pilots in time direction is usually significantly smaller than the number of pilots in frequency direction, but the pilot spacing frequency in time direction is similar. Since $N''_P << N'_P$ the leakage of the Doppler domain transform will be more significant. On the other hand, when only the symbols in the centre of the processed pilots are used, the performance may be improved, since the estimation error is typically much lower at the centre compared to the area near the edges.

Up to now much of discussion is dealing with 1D channel estimation in frequency direction over one OFDM symbol in the i variable. The proposed techniques are, however, also applicable to channel estimation in time direction in a straight forward way (i.e. estimating in the l variable). Moreover, an extension to a multi carrier system with correlations in two dimensions is possible by using two cascaded one dimensional Wiener filters. This idea has been suggested for SISO channel estimation by e.g. P. Hoeher, S. Kaiser, and P. Robertson, "Two-Dimensional Pilot-Symbol-Aided Channel Estimation by Wiener Filtering", in Proc. IEEE Intern. Conf. On Acoustics, Speech, and Signal Processing. (ICASSP'97), Munich, Germany pp. 1845-1848, 1997, and can be extended to the MIMO case.

The inventive apparatus for estimating a plurality of channels is operative to translate phase shifts into delays in order to estimate channel information, i.e. a channel impulse response of one of a plurality of communication channels. Hence, phase shifted sequences are perfectly suitable for channel estimation. Moreover, also other orthogonal sequences can be applied to channel estimation, as long as the pilot symbols have a particular phase shift characteristic with respect to other pilot symbols. That means, that the phase shift between two pilot sequences may vary following a predetermined function so that for example a first half of a first pilot sequence has a phase shift with respect to a first half of a second pilot sequence and a second half of the pilot sequence has a further phase shift with respect to a second half of the second pilot sequence. Therefore, the phase shift characteristics of the pilot sequences can be exploited at the transmitting points to estimate the channel by applying for example the inventive low complexity channel estimation scheme.

As an example of orthogonal sequences, the properties of Hadamard sequences are studied. For a system with $N_T$ transmit antennas a set Hadamard basis function of order $N_T$, denoted by H is used. In order to generate $\tilde{X}'^{(\mu)}_I$, the $\mu^{th}$ column of these basis functions are periodically extended to pilot sequence length $N'_P$, as discussed above. For example, for $N_T=2$ the Hadamard sequences are identical to the phase shifted sequences, i.e. $\tilde{X}'^{(1)}_I$ is the all one sequence, and the second sequence is oscillating between 1 and −1, i.e. $X'^{(2)}_I=[1,-1,1,\ldots,-1]^T$. If $N_T=4$, the Hadamard sequences can be cast into the matrix $$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

It is easy to clarify that $H_4$ is symmetric and orthogonal i.e. $H_4=H_4^T$ and $H_4 \cdot H_4^T = 4 \cdot I$. In case that $N_T=4$, the received pilot sequence transformed into the time domain, is defined by $\zeta_{\tilde{I}} = 1/N'_P \tilde{F}^H \hat{Y}'_{\tilde{I}}$. It will be shown, that the least squares estimators for transmit antennas 1, ..., 4 is given by $$\tilde{h}'^{(1)}_{LS_{\tilde{I}}} = \zeta^{(1)}_{\tilde{I}} = \tilde{h}'^{(1)}_{\tilde{I}} + \tilde{n}'_{\tilde{I}_1}$$

$$\tilde{h}'^{(2)}_{LS_{\tilde{I}}} = \zeta^{(3)}_{\tilde{I}} = \tilde{h}'^{(2)}_{\tilde{I}} + \tilde{n}'_{\tilde{I}_2}$$

$$\tilde{h}'^{(3)}_{LS_{\tilde{I}}} = e^{-j\pi/4}\zeta^{(2)}_{\tilde{I}} + e^{-j\pi/4}\zeta^{(4)}_{\tilde{I}} = \tilde{h}'^{(3)}_{\tilde{I}} + \tilde{n}'_{\tilde{I}_3}$$

$$\tilde{h}'^{(4)}_{LS_{\tilde{I}}} = e^{-j\pi/4}\zeta^{(2)}_{\tilde{I}} + e^{j\pi/4}\zeta^{(4)}_{\tilde{I}} = \tilde{h}'^{(4)}_{\tilde{I}} + \tilde{n}'_{\tilde{I}_4}$$

where $\zeta^{(\mu)}_{\tilde{I}}$ accounts the part of $\zeta_{\tilde{I}}$, assuming that $\zeta_{\tilde{I}}$ is divided into $N_T$ equal parts, i.e. $\zeta_{\tilde{I}} = [\zeta^{(1)^T}_{\tilde{I}}, \ldots, \zeta^{(N_T)^T}_{\tilde{I}}]^T$. Furthermore, $\tilde{n}'_{\tilde{I},\mu}$ denotes the resulting noise term of $\mu^{th}$ part. It is seen that the signal of antenna 2 is received in partition 3. This may be confusing and can be fixed by exchanging columns 2 and 3 of $H_{NT}$.

To apply the above simplification of the receiver structure with pilot sequences based on Hadamard codes, additional processing may be necessary. For the case $N_T=4$ and pilot sequence is based on Hadamard codes, the receiver structure of the FFT is derived. The starting point is the received pilot sequence transformed into time domain given by $\zeta_{\tilde{I}} = 1/N'_P \tilde{F}^H \hat{Y}'_{\tilde{I}}$. The DFT of the pilot sequence $\tilde{X}^{(\mu)}_{I,\tilde{I}}$ for transmit antenna 1, ..., 4 can be expressed as $$F_{N'_P}(\tilde{X}^{(1)}_{I,\tilde{I}})_{q-n} = N'_P \delta_{n-q}$$

$$F_{N'_P}(\tilde{X}^{(2)}_{I,\tilde{I}})_{q-n} = N'_P \delta_{n-q-N'_P/2}$$

$$F_{N'_P}(\tilde{X}^{(3)}_{I,\tilde{I}})_{q-n} = \frac{N'_P}{2} \cdot \left(e^{j\pi/4}\delta_{n-q-N'_P/4} + e^{-j\pi/4}\delta_{n-q-N'_P 3/4}\right)$$

$$F_{N'_P}(\tilde{X}^{(4)}_{I,\tilde{I}})_{q-n} = \frac{N'_P}{2} \cdot \left(e^{-j\pi/4}\delta_{n-q-N'_P/4} + e^{j\pi/4}\delta_{n-q-N'_P 3/4}\right)$$

Hence, it can be observed that the signal from antenna 1 is identical to the case of phase shifted sequences are used, and the signal from antenna 3 is the same as the signal from antenna 2 in the above equation, which corresponds to the least squares (LS) estimate. This is due to the inventive arrangements of the codes and may be fixed by exchanging for example columns 2 and 3. The DFT of pilots 3 and 4 in the above equation consists of two impulses which interfere with each other. Furthermore, the DFT of pilot 3, $F_{N'_P}(\tilde{X}^{(3)}_{I,\tilde{I}})_{q-n}$, is the conjugate complex of $F_{N'_P}(\tilde{X}^{(4)}_{I,\tilde{I}})_{q-n}$. Hence, $$\zeta_{\tilde{I},n} = \begin{cases} \tilde{h}^{(1)}_{\tilde{I},n} + \tilde{n}_{\tilde{I},n}, & n = 1\{1, \ldots, \frac{1}{4}N'_P\} \\ e^{j\pi/4}\tilde{h}^{(3)}_{\tilde{I},n} + e^{-j\pi/4}\tilde{h}^{(4)}_{\tilde{I},n} + \tilde{n}_{\tilde{I},n} & n = \{\frac{1}{4}N'_P+1, \ldots, \frac{1}{2}N'_P\} \\ \tilde{h}^{(2)}_{\tilde{I},n} + \tilde{n}_{\tilde{I},n}, & n = \{\frac{1}{2}N'_P+1, \ldots, \frac{3}{4}N'_P\} \\ e^{-j\pi/4}\tilde{h}^{(3)}_{\tilde{I},n} + e^{j\pi/4}\tilde{h}^{(4)}_{\tilde{I},n} + \tilde{n}_{\tilde{I},n} & n = \{\frac{3}{4}N'_P+1, \ldots, N'_P\} \end{cases}$$

where again it is assumed that $Q \leq N'_P/N_T$. Removing the inserted phase shift of the pilots and adding the two-parts of the signal, the equation to be shown follows readily.

In practice, two times oversampling provides a good trade of between minimising the system overhead due to pilots and optimising the performance. It is assumed that the length of the guard interval is not smaller than Q, i.e. the guard interval is not shorter than the maximum delay of the channel.

Moreover, depending on certain implementation requirements of the inventive method for estimating a plurality of channels or for providing a plurality of different pilot sequences can be implemented in hardware or in software. The implementation can be performed using a digital storage medium, in particular a disc or a CD having electronically readable control signals stored thereon, which can cooperate with a programmable computer system such that the inventive methods are performed. Generally, the present invention is, therefore, a computer-program product with a program code stored on a machine-readable carrier, the program code being for performing the inventive methods, when the computer program product runs on a computer. In other words, the inventive method is, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for estimating a plurality of channels from a plurality of distinct transmitting points to a receiving point, wherein an input signal includes a superposition of a first signal based on a first pilot sequence transmittable from a first transmitting point and a second signal based on a second pilot sequence transmittable from a second transmitting point, the first pilot sequence and the second pilot sequence being orthogonal to each other within a predetermined orthogonality range and having a phase shift to each other, comprising:
   a transformer for transforming the input signal into a transformed signal having a set of discrete values, the transformer being operative to translate the phase shift between the first and the second pilot sequence into a delay, so that a first group of the set of the discrete values includes channel information of a first channel from the first transmitting point to the receiving point and that a second group of the set of discrete values includes channel information of a second channel from the second transmitting point to the receiving point;
   a selector for selecting the first group from the set of discrete values and for selecting the second group from the set of discrete values to obtain selected groups; and
   a processor for determining channel information for the plurality of channels based on the selected groups.

2. Apparatus in accordance with claim 1, wherein the input signal includes, in a superimposed manner, a third signal based on a third pilot sequence transmittable from a third transmitting point, the third pilot sequence being orthogonal to the first and the second pilot sequences within the orthogonality range, and having a further phase shift to the first pilot sequence, the transformer being further operative to translate the further phase shift into a further delay, so that a third group of the set of discrete values includes channel information of a third channel from the third transmitting point to the receiving point; and
   wherein the selector is operative to further select the third group from the set of discrete values to obtain a selected third group.

3. Apparatus in accordance with claim 1, wherein each group consists of an equal number of successive discrete values of the set of discrete values.

4. Apparatus in accordance with claim 1, wherein the transformer is operative to perform a Fourier transform or a fast Fourier transform or a discrete Fourier transform or an inverse Fourier transform or an inverse fast Fourier transform or an inverse discrete Fourier transform on the input signal.

5. Apparatus in accordance with claim 1, wherein the set of discrete values includes a total number of discrete values, the number being obtained by the transformer.

6. Apparatus in accordance with claim 5, in which the plurality of transmitting points has a total number of transmitting points, wherein the selector is operative to select, as a group, a number of successive discrete values, the number being equal to the total number of discrete values divided by the total number of transmitting points.

7. Apparatus in accordance with claim 6, in which the selector is operative to select the groups such that a first discrete value of the set of discrete values is a first discrete value in the first group and a first discrete value of the second group of discrete values is a discrete value in the set of discrete values succeeding a discrete value having a highest order of the values selected to obtain the first group.

8. Apparatus in accordance with claim 1, in which the input signal is a set of successive input signal values, and in which the transformer is operative to transform the set of successive input signal values into the set of discrete values, wherein a total number of discrete values of the set of discrete values is equal to a total number of input signal values in the set of input signal values.

9. Apparatus in accordance with claim 1, in which the transformer is operative to perform a transform algorithm, and in which the set of discrete values is generated by a single execution of the transform algorithm by the transformer.

10. Apparatus in accordance with claim 9, in which the transform algorithm being performed by the transformer is a Fourier transform or a fast Fourier transform or a discrete Fourier transform or an inverse Fourier transform or an inverse fast Fourier transform or an inverse discrete Fourier transform algorithm applied to the total number of input signal values.

11. Apparatus in accordance with claim 1, wherein the pilot sequences include a complex amplitude sequence and phase information, wherein the complex amplitude sequence is the same for the pilot sequences, comprising:
    a multiplier being operative to multiply a received signal by a complex-conjugated version of the amplitude sequence to obtain the input signal.

12. Apparatus in accordance with claim 11, wherein the received signal is a set of successive discrete received signal values and wherein the complex conjugated version of the amplitude sequence is a set of successive discrete complex conjugated amplitude signal values, and
    wherein the multiplier is operative to perform a single complex multiplication for a value of the set of successive discrete signal values and a corresponding value of the set of successive discrete complex conjugated amplitude signal values, so that after a number of single multiplications the set of successive discrete input values is obtained.

13. Apparatus in accordance with claim 1, in which the processor for determining channel information is operative to receive the selected groups and to output the selected groups, each group of the selected groups including channel information of a particular channel.

14. Apparatus in accordance with claim 13, wherein the processor for determining channel information is operative to determine the channel information by outputting the selected groups, each group including channel impulse responses of a particular channel as channel information.

15. Apparatus in accordance with claim 13, wherein the processor for determining channel information includes a time/frequency converter for obtaining a channel transfer function as the channel information.

16. Apparatus in accordance with claim 1, wherein a group of the selected groups and a further group of the selected groups include channel information of a channel and channel information of a further channel in a super imposed manner, wherein the processor for determining channel information is operative to determine the channel information of the channel and the channel information of the further channel based on the group and on the further group.

17. Apparatus in accordance with claim 16, wherein a group of the selected groups includes a superposition of the channel information of a channel being multiplied by a phase shift factor and of a further channel information of a further channel being multiplied by a further phase shift factor, and wherein a further group of the selected groups includes a superposition of the channel information of the channel being multiplied by the complex conjugated phase shift factor and of the further channel information of the further channel being multiplied by the complex-conjugated further phase shift factor, the phase shift factor and the further phase shift factor being caused by the pilot sequences, wherein the processor for determining channel information is operative to determine the channel information of the channel and the channel information of the further channel using the group and the further group.

18. Apparatus in accordance with claim 17, wherein the processor for determining channel information is operative to determine the channel information and the further channel information using phase shift operations and addition and/or subtraction operations applied to the group and to the further group.

19. Apparatus in accordance with claim 17, wherein the phase shift factor is a function of a phase shift of 180 degrees divided by the total number of transmitting points.

20. Apparatus in accordance with claim 1, wherein a channel information is corrupted by a distortion signal, the processor for determining further comprising an estimator being operative to estimate the channel information from the corrupted channel information.

21. Apparatus in accordance with claim 20, wherein the estimator is operative to perform a minimum mean squared error estimation or a maximum a posteriori estimation or a maximum likelihood estimation for providing an estimated channel information.

22. Apparatus in accordance with claim 1, in which the pilot sequences are used to modulate a discrete carrier in a multi carrier modulation scheme at a predetermined time instant, the apparatus further comprising:

a controller for detecting the input signal in a received signal and for enabling the transformer, the selector or the processor for determining only when the input signal is detected in the received signal.

23. Apparatus in accordance with claim 1, in which the pilot sequences are used to modulate the same pilot carrier in a multi carrier modulation scheme at distinct transmitting time instants, the apparatus further comprising:

a controller for detecting a pilot carrier in a received signal including successive multi carrier modulated symbols and for collecting values of the pilot carrier at time instants corresponding to transmitting instants to obtain the input signal, wherein the channel information obtained by processing the input signal using the transformer, the selector and the processor for determining includes information on a multi carrier channel from transmitting points to receiving point defined by the pilot carrier over time.

24. Apparatus in accordance with claim 1, wherein the apparatus further comprises a single processor for windowing the input signal to obtain a windowed input signal to be used as the input signal for the transformer.

25. Method for estimating a plurality of channels from a plurality of distinct transmitting points to a receiving point, wherein an input signal includes a superposition of a first signal based on a first pilot sequence transmittable from a first transmitting point and a second signal based on a second pilot sequence transmittable from a second transmitting point, the first pilot sequence and the second pilot sequence being orthogonal to each other within a predetermined orthogonality range and having a phase shift to each other, comprising the following steps:

transforming the input signal into a transformed signal having a set of discrete values by translating the phase shift between the first and the second pilot sequence into a delay, so that a first group of the set of discrete values includes channel information of a first channel from the first transmitting point to the receiving point and that a second group of the set of discrete values includes channel information of a second channel from the second transmitting point to the receiving point;

selecting the first group from the set of discrete values and selecting the second group from the set of discrete values to obtain selected groups;

determining channel information for the plurality of channels on the basis of the selected groups.

* * * * *